United States Patent
Edge

(10) Patent No.: US 11,678,134 B2
(45) Date of Patent: *Jun. 13, 2023

(54) NETWORK INDEPENDENT LOCATION SERVICES

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

This patent is subject to a terminal disclaimer.

(21) Appl. No.: 17/064,501

(22) Filed: Oct. 6, 2020

(65) Prior Publication Data
US 2021/0092552 A1  Mar. 25, 2021

Related U.S. Application Data

(60) Continuation of application No. 14/796,033, filed on Jul. 10, 2015, now Pat. No. 10,841,729, which is a
(Continued)

(51) Int. Cl.
*G06Q 20/00* (2012.01)
*H04W 4/021* (2018.01)
(Continued)

(52) U.S. Cl.
CPC ............ *H04W 4/021* (2013.01); *G01S 19/48* (2013.01); *G06Q 20/3829* (2013.01);
(Continued)

(58) Field of Classification Search
None
See application file for complete search history.

(56) References Cited

U.S. PATENT DOCUMENTS 6,785,551 B1 * 8/2004 Richard .................. H04L 67/12
455/456.1
7,170,447 B2  1/2007 Riley et al.
(Continued)

FOREIGN PATENT DOCUMENTS

JP  2004032376  1/2004
JP  2004259266  9/2004
(Continued)

OTHER PUBLICATIONS

Gao et al. Global Differential GPS Positioning without Using a Base Station. (Jun. 15, 2002). Retrieved online Jul. 9, 2020. https://www.tandfonline.com/doi/pdf/10.1080/10824000209480568 (Year: 2002).*
(Continued)

*Primary Examiner* — James A Reagan
(74) *Attorney, Agent, or Firm* — QUALCOMM Incorporated

(57) ABSTRACT

Techniques for supporting network independent location services (LCS) are described. In one design, a location center may communicate with a terminal to establish an account for the terminal with the location center for location services. The location center may establish the account for the terminal independent of a home network or a serving network for the terminal. During signup to establish the account, the location center may (i) provide address information for the location center, security information, and/or other information for the location center and (ii) receive public identity information and/or other information for the terminal. The location center may thereafter provide location services to the terminal based on the established account and without interacting with the home or serving network for the terminal. Techniques for supporting delivery of assistance data are also described.

10 Claims, 16 Drawing Sheets

Related U.S. Application Data division of application No. 12/046,259, filed on Mar. 11, 2008, now Pat. No. 9,083,745.

(60) Provisional application No. 60/950,578, filed on Jul. 18, 2007, provisional application No. 60/894,282, filed on Mar. 12, 2007.

(51) Int. Cl.
| | |
|---|---|
| *G01S 19/48* | (2010.01) |
| *G06Q 20/38* | (2012.01) |
| *H04W 64/00* | (2009.01) |
| *H04W 4/029* | (2018.01) |
| *H04W 12/069* | (2021.01) |
| *H04W 12/64* | (2021.01) |
| *H04L 67/52* | (2022.01) |
| *H04L 9/40* | (2022.01) |
| *G01S 5/02* | (2010.01) |
| *G01S 5/10* | (2006.01) |
| *G01S 19/05* | (2010.01) |

(52) U.S. Cl.
CPC .............. *H04L 63/18* (2013.01); *H04L 67/52* (2022.05); *H04W 4/029* (2018.02); *H04W 12/069* (2021.01); *H04W 12/64* (2021.01); *H04W 64/00* (2013.01); *G01S 5/0236* (2013.01); *G01S 5/10* (2013.01); *G01S 19/05* (2013.01); *H04L 63/0869* (2013.01)

(56) References Cited

U.S. PATENT DOCUMENTS

| | | | |
|---|---|---|---|
| 7,317,910 B2 | 1/2008 | Niemenmaa et al. | |
| 7,548,746 B2 | 6/2009 | Kalke | |
| 7,586,438 B1* | 9/2009 | Lawrence ............... | G01S 5/009 342/357.4 |
| 7,840,355 B2* | 11/2010 | Breed ..................... | G01S 19/17 701/472 |
| 7,899,621 B2* | 3/2011 | Breed ..................... | G05D 1/0246 701/117 |
| 7,912,645 B2* | 3/2011 | Breed ..................... | G08G 1/164 701/408 |
| 8,023,958 B2 | 9/2011 | Wang et al. | |
| 8,068,056 B2 | 11/2011 | Wachter et al. | |
| 8,255,144 B2* | 8/2012 | Breed ..................... | G01S 17/86 340/436 |
| 8,838,132 B2* | 9/2014 | Prakash ................ | G01S 5/0236 455/456.6 |
| 8,965,677 B2* | 2/2015 | Breed ..................... | G01S 19/50 701/301 |
| 9,083,745 B2* | 7/2015 | Edge ..................... | G01S 19/48 |
| 10,841,729 B2* | 11/2020 | Edge ..................... | H04W 4/029 |
| 2002/0049537 A1* | 4/2002 | Dooley ................ | G01S 5/0027 701/470 |
| 2002/0072855 A1* | 6/2002 | Fuchs ................... | G01S 5/0036 701/471 |
| 2002/0147000 A1* | 10/2002 | Holmes-Kinsella ........................ G06Q 20/3552 455/405 |  |
| 2002/0171581 A1* | 11/2002 | Sheynblat ............ | G01S 5/0036 342/357.46 |
| 2002/0180696 A1* | 12/2002 | Maritzen ................ | G06F 21/32 345/156 |
| 2003/0120555 A1* | 6/2003 | Kitagawa ........... | G01C 21/3623 705/26.1 |
| 2003/0125044 A1 | 7/2003 | Deloach et al. | |
| 2003/0172090 A1 | 9/2003 | Asunmaa et al. | |
| 2003/0236095 A1* | 12/2003 | Ross ..................... | H04W 64/00 455/456.1 |
| 2004/0044911 A1 | 3/2004 | Takada et al. | |
| 2004/0097244 A1* | 5/2004 | Yamazaki ........ | H04M 1/72572 455/456.3 |
| 2004/0137890 A1 | 7/2004 | Kalke | |
| 2004/0152471 A1* | 8/2004 | MacDonald .......... | G01S 5/0252 455/456.1 |
| 2004/0160365 A1 | 8/2004 | Riley et al. | |
| 2004/0181326 A1* | 9/2004 | Adams .................... | G01C 21/26 701/33.4 |
| 2004/0210450 A1 | 10/2004 | Atencio et al. | |
| 2005/0020309 A1* | 1/2005 | Moeglein ................ | G01S 19/46 455/456.1 |
| 2005/0153687 A1 | 7/2005 | Niemenmaa et al. | |
| 2005/0239480 A1 | 10/2005 | Kim et al. | |
| 2006/0240841 A1* | 10/2006 | Bhattacharya ........ | H04W 64/00 455/12.1 |
| 2007/0043829 A1* | 2/2007 | Dua ..................... | H04L 29/1216 709/219 |
| 2007/0149208 A1* | 6/2007 | Syrbe ..................... | H04W 4/024 455/456.1 |
| 2008/0227465 A1* | 9/2008 | Wachter ................ | H04W 64/00 455/456.1 |
| 2008/0228654 A1* | 9/2008 | Edge .................. | G06Q 20/3829 455/456.2 |
| 2011/0039576 A1* | 2/2011 | Prakash ................ | G01S 5/0236 455/456.1 |
| 2012/0262335 A1* | 10/2012 | Holcman .............. | H04W 24/10 342/357.42 |
| 2015/0319571 A1* | 11/2015 | Edge ........................ | H04W 4/02 455/456.1 |
| 2021/0092552 A1* | 3/2021 | Edge .................. | G06Q 20/3829 |

FOREIGN PATENT DOCUMENTS

| | | | | |
|---|---|---|---|---|
| JP | 2005312057 | | 11/2005 | |
| JP | 2006105640 | | 4/2006 | |
| JP | 2006105640 A | * | 4/2006 | ............. G01C 21/20 |
| WO | 9518977 | | 7/1995 | |
| WO | WO-9518977 A1 | * | 7/1995 | ............. G01C 21/28 |
| WO | 9808056 | | 2/1998 | |
| WO | WO-9808056 A1 | * | 2/1998 | ........... G09B 29/106 |
| WO | 03007633 | | 1/2003 | |
| WO | 2003058986 | | 7/2003 | |
| WO | 2004075016 | | 9/2004 | |
| WO | 2004080096 | | 9/2004 | |
| WO | 2005039223 | | 4/2005 | |
| WO | 2006014091 | | 2/2006 | |
| WO | 2006029277 | | 3/2006 | |
| WO | 2007025143 | | 3/2007 | |
| WO | 2007025159 | | 3/2007 | |

OTHER PUBLICATIONS

Wikipedia. Assisted GPS. (Jan. 15, 2006). Retrieved online Jul. 9, 2020. https://en.wikipedia.org/wiki/Assisted_GPS (Year: 2006).*
Stone, William A. An Overview of Global Positioning System Continuously Operating Reference Stations. (Feb. 1, 2001). Retrieved online Jul. 9, 2020. https://www.ngs.noaa.gov/PUBS_LIB/GPS_CORS.html (Year: 2001).*
"3rd Generation Partnership Project; Technical Specification Group Services and System Aspects; LCS Architecture for 3GPP Interworking WLAN, Release 7", 3GPP Standard; 3GPP TR 23.887, 3rd Generation Partnership Project (3GPP), Mobile Competence Centre; 650, Route Des Lucioles; F-06921 Sophia-Antipolis Cedex; France, No. V0.3.0, Jun. 12, 2006 (Jun. 12, 2006), p. 1-17, XP050400310, [retrieved on Jun. 12, 2006].
European Search Report—EP12157578—Search Authority—The Hague—dated Jun. 24, 2014.
European Search Report—EP12157582—Search Authority—The Hague—dated Sep. 4, 2014.
European Search Report—EP12157583—Search Authority—The Hague—dated Jul. 23, 2012.
Gao Y., et al., "Global Differential GPS Positioning without Using a Base Station", Geographic Information Sciences, Jun. 15, 2002, vol. 8, No. 1, pp. 8-15, Retrieved online Jul. 9, 2020, https://www.tandfonline.com/doi/pdf/10.1080/10824000209480568.
International Preliminary Report on Patentability—PCT/US2008/056736, The International Bureau of WIPO—Geneva, Switzerland, dated Sep. 15, 2009.

(56) References Cited

OTHER PUBLICATIONS

International Search Report and Written Opinion—PCT/US2008/056736, International Search Authority—European Patent Office—dated Jan. 13, 2009.
Menezes A.J., et al., "Handbook of Applied Cryptography," CRC Press Series on Discrete Mathematics and Its Applications, Boca Raton, FL, USA, Jan. 1, 1997, pp. 66, XP002508969.
Partial International Search Report—PCT/US08/056736, International Search Authority—European Patent Office—dated Sep. 5, 2008.
TomTom, "TomTom GO 300/500/700 Benutzerhandbuch," Internet Citation, [Online] pp. 1-46, XP002392957 Retrieved from the Internet: URL:http://www.tomtom.com/lib/doc/go5/ttgo5_manual.htm [retrieved on Aug. 1, 2006].
Wikipedia, "Assisted GPS", Jan. 15, 2006, pp. 1-4, Retrieved online Jul. 9, 2020, https://en.wikipedia.org/wiki/Assisted_GPS.
William A., et al., "An Overview of Global Positioning System Continuously Operating Reference Stations", Feb. 1, 2001, pp. 1-9, Retrieved online Jul. 9, 2020, https://www.ngs.noaa.gov/PUBS_LIB/GPS_CORS.html.

* cited by examiner

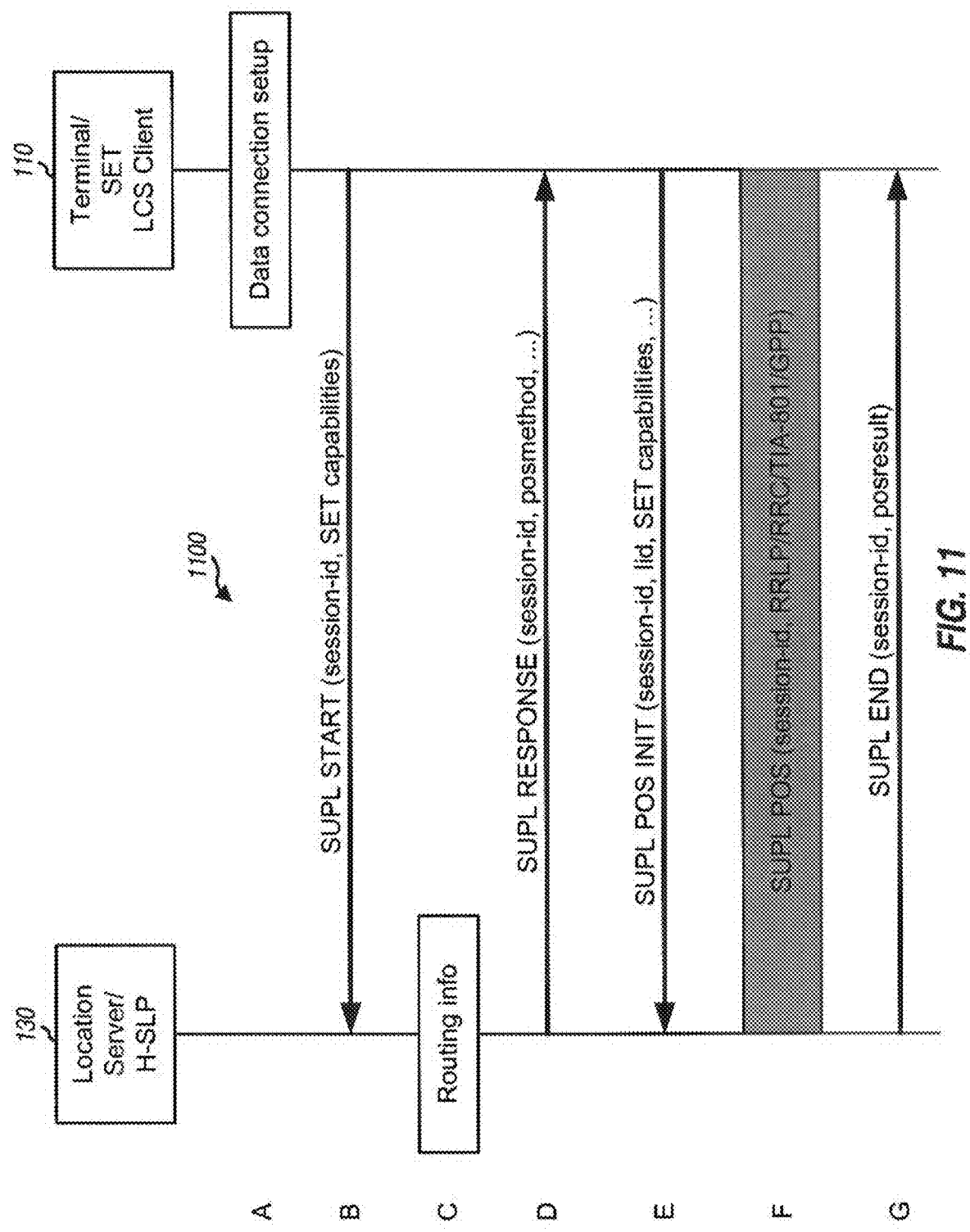

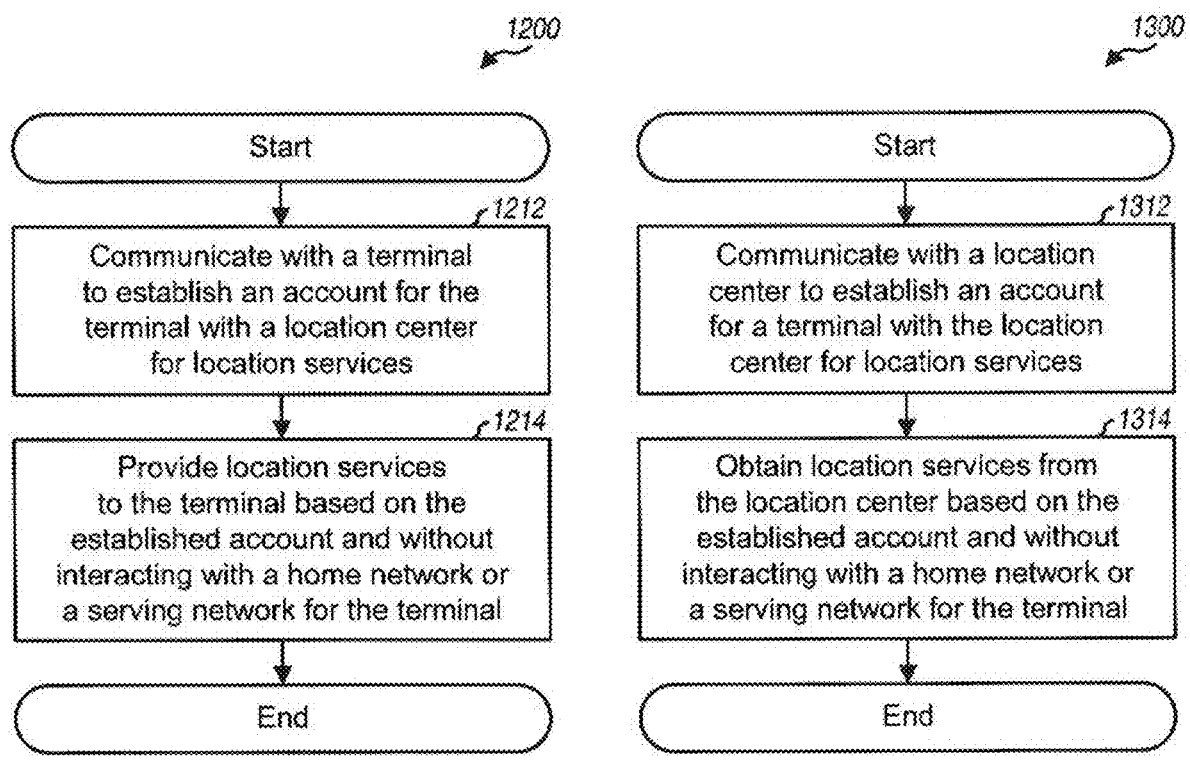

NETWORK INDEPENDENT LOCATION SERVICES

The present application is a continuation application of U.S. application Ser. No. 14/796,033, entitled "Network Independent Location Services", filed Jul. 10, 2015, which is a divisional application of U.S. application Ser. No. 12/046,259, entitled "Network Independent Location Services," filed Mar. 11, 2008, now U.S. Pat. No. 9,083,745, issued Jul. 14, 2015 which claims priority to provisional U.S. Application Ser. No. 60/894,282, entitled "Network Independent Location Services," filed Mar. 12, 2007, and provisional U.S. Application Ser. No. 60/950,578, entitled "Network Independent Location Services," filed Jul. 18, 2007, all of which are assigned to the assignee hereof and incorporated herein by reference in their entirety.

BACKGROUND

I. Field

The present disclosure relates generally to communication, and more specifically to techniques for supporting location services (LCS) for terminals.

II. Background

It is often desirable, and sometimes necessary, to know the location of a terminal, e.g., a cellular phone. The terms "location" and "position" are synonymous and are used interchangeably herein. For example, an LCS client may desire to know the location of the terminal and may communicate with a location center in order to request the location of the terminal. The location center and the terminal may then exchange messages, as necessary, to obtain a location estimate for the terminal. The location center may then return the location estimate to the LCS client.

Various LCS standards have been developed by organizations such as "3rd Generation Partnership Project" (3GPP), "3rd Generation Partnership Project 2" (3GPP2), and Open Mobile Alliance (OMA). These LCS standards allow a terminal to obtain its location or the location of another terminal. These LCS standards also allow an LCS client to request and obtain the location of a target terminal. The LCS standards generally require support from a home wireless network of a terminal being located and/or a serving wireless network currently serving the terminal. This support is needed in order to (i) interpret and transfer a location request from an LCS client to the serving or home wireless network and (ii) return a location response with a location estimate for the terminal from the serving or home wireless network to the LCS client. This support is also needed to perform positioning for the terminal and/or to assist the terminal make positioning related measurements and perform positioning. Since these LCS standards rely on support from the serving and/or home wireless network, a third party location provider may not be able to provide location services for the terminal unless the serving and/or home wireless network supports location services and there is a business arrangement between the location provider and the serving and/or home wireless network.

SUMMARY

Techniques for supporting network independent LCS are described herein. The techniques may allow terminals to obtain location services from third party location providers without relying on support of location services by home and serving networks. In one design of network independent LCS, a location center may communicate with a terminal to establish an account for the terminal with the location center for location services. The location center may establish the account for the terminal independent of a home network or a serving network for the terminal. During signup to establish the account, the location center may (i) provide address information for the location center, security information, and/or other information for the location center and (ii) receive public identity (e.g., dialing) information and/or other information for the terminal. The location center may thereafter provide location services to the terminal based on the established account and without interacting with the home or serving network for the terminal. For mobile-terminated location request (MT-LR), the location center may send a location request to the terminal based on the public identity information for the terminal. For mobile-terminated location request (MO-LR), the location center may receive a location request sent by the terminal based on the address information for the location center. For both MT-LR and MO-LR, the location center may establish secure communication with the terminal based on the security information and may provide location service via the secure communication.

Techniques for supporting delivery of assistance data are also described herein. Various aspects and features of the disclosure are also described in further detail below.

BRIEF DESCRIPTION OF THE DRAWINGS

FIG. 11 shows a process for SET-initiated location service in SUPL.

FIG. 12 shows a process for supporting location services by the location center.

FIG. 13 shows a process for obtaining location services by the terminal.

DETAILED DESCRIPTION

The techniques described herein allow a location provider to support location services for terminals without relying on serving and home networks, which is referred to as network independent LCS. The techniques may be used with various LCS standards such as Secure User Plane Location (SUPL) from OMA, V1 and V2 from Code Division Multiple Access (CDMA) Development Group (CDG), X.S0024 from 3GPP2, etc. SUPL is applicable for 3GPP, 3GPP2, and wireless local area network (WLAN) networks. X.S0024, V1 and V2 are applicable for 3GPP2 networks. These LCS standards are also referred to as location solutions. For clarity, certain aspects of the techniques are described below for SUPL.

Figure 1:
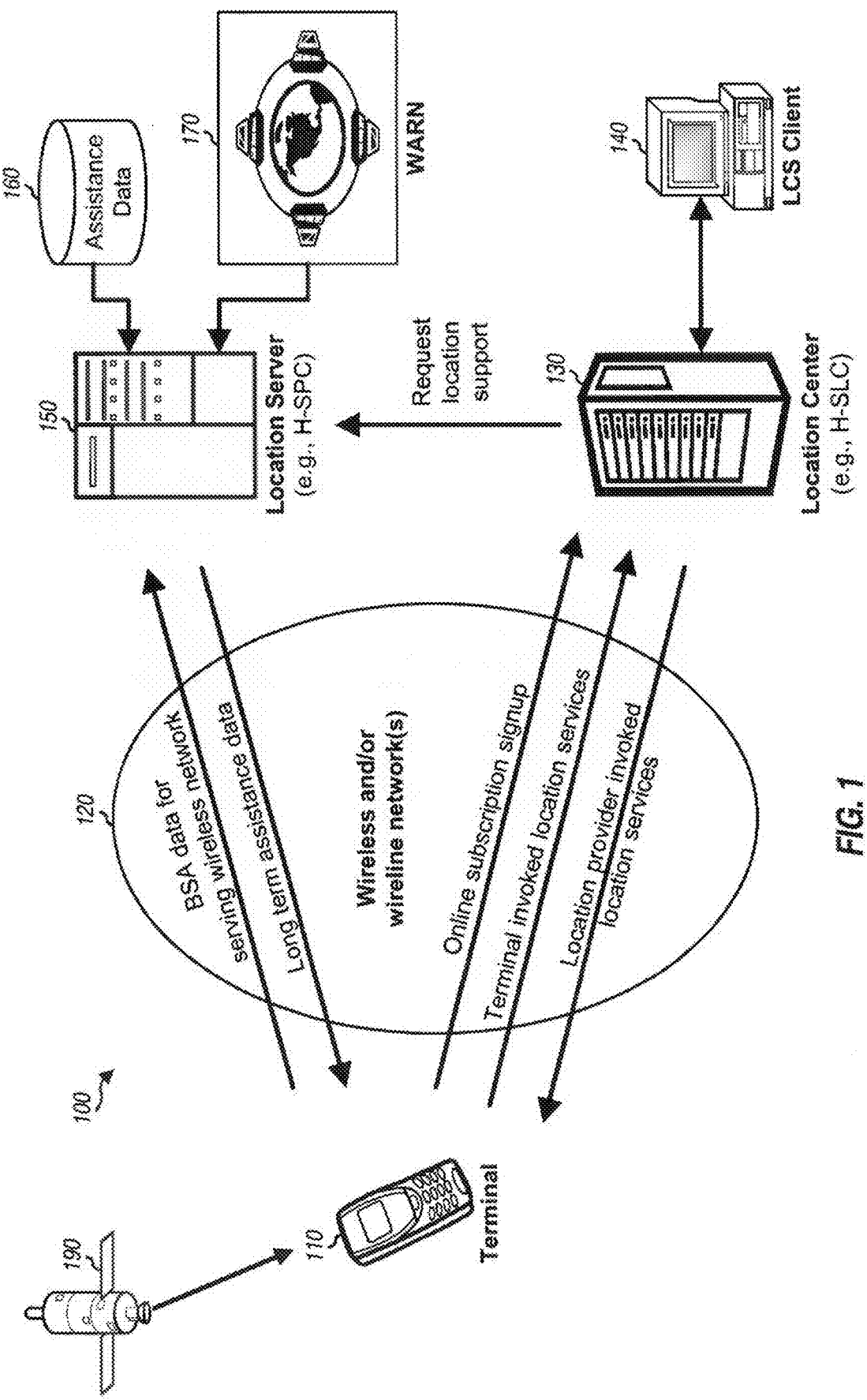
FIG. 1 shows a deployment supporting network independent LCS.

FIG. 1 shows an example deployment 100 supporting network independent LCS. A terminal 110 may communicate with one or more wireless and/or wireline networks 120 to obtain communication services and/or data connectivity. Terminal 110 may be stationary or mobile and may also be referred to as a mobile station (MS), a user equipment (UE), an access terminal, a subscriber unit, a station, etc. Terminal 110 may be a cellular phone, a personal digital assistant (PDA), a wireless device, a wireline device, a wireless modem, a laptop computer, a personal computer (PC), a telemetry device, a tracking device, etc. Terminal 110 may communicate with one or more base stations in a wireless network and/or one or more servers in a wireline network. Terminal 110 may communicate directly with a wireless and/or wireline network or may communicate via one or more other entities (e.g., PCs, laptops, gateways, cellular phones, PDAs, etc.) that are in communication with a wireless and/or wireline network. Terminal 110 may also receive signals from one or more satellites 190, which may be part of the United States Global Positioning System (GPS), the European Galileo system, the Russian GLONASS system, or a Global Navigation Satellite System (GNSS). Terminal 110 may measure signals from satellites 190 and obtain pseudo-range measurements for the satellites. Terminal 110 may also measure signals from base stations in a wireless network and obtain timing measurements for the base stations. The pseudo-range measurements and/or timing measurements may be used to derive a location estimate for terminal 110. A location estimate is also referred to as a position estimate, a position fix, etc.

Network(s) 120 may include a wireless network that provides radio communication for terminals located within its coverage area. A wireless network may also be referred to as an access network, a radio network, a radio access network, etc. A wireless network may be (i) a home wireless network with which terminal 110 has service subscription and/or (ii) a serving wireless network currently serving the terminal. The serving and home wireless networks may be the same or different wireless networks. Alternatively or additionally, network(s) 120 may include a wireline network such as a local area network (LAN), a digital subscriber line (DSL) network, a packet cable network, an Internet Service Provider (ISP) network, a telephone network, the Internet, and/or other voice and data networks. In the description herein, a home network may be a home wireless network, or a home wireline network, or a home wireless and wireline network, a serving network may be a serving wireless network, or a serving wireline network, or a serving wireless and wireline network, and a network operator may be a wireless network operator/service provider and/or a wireline network operator/service provider.

A location center 130 may support network independent LCS for terminals and may be operated or leased by a location provider, which may be independent or part of a network operator/service provider. Location center 130 may also be referred to as a gateway, a location platform, etc. Location center 130 may perform various functions such as signup of users, support of location services, support of subscriber privacy, authorization, authentication, charging/billing, service management, etc. Location center 130 may comprise a SUPL Location Center (SLC), a SUPL Location Platform (SLP), a 3GPP Gateway Mobile Location Center (GMLC), a 3GPP2 Mobile Position Center (MPC), etc. An LCS client 140 may communicate with location center 130, either directly or via another location center, to obtain location information for LCS targets. An LCS client is a function or entity that requests location information for LCS targets. An LCS target is a terminal whose location is being sought.

A location server 150 may support positioning for terminals and may be operated or leased by the location provider or some other entity. Location server 150 may perform various functions to support positioning, e.g., calculate location estimates, deliver assistance data to terminals, perform functions for security, etc. Positioning refers to a process to determine a geographic or civil location estimate for an LCS target (e.g., obtain latitude, longitude and altitude coordinates for geographic location or a street address for civil location). Location server 150 may comprise a SUPL Positioning Center (SPC), a 3GPP Serving Mobile Location Center (SMLC), a 3GPP2 Position Determining Entity (PDE), etc. Location server 150 may be separate from location center 130 (as shown in FIG. 1) or may be part of location center 130. A storage unit 160 may store a database of assistance data and may provide assistance data as requested by location server 150. A Wide Area Reference Network (WARN) 170 may monitor satellites and provide location server 150 with satellite reference information for the coverage areas of the location server. The satellite reference information may comprise GPS ephemeris information and differential correction for the GPS ephemeris information and may be used in GPS and Assisted GPS (A-GPS) location calculations.

Location services are typically available only through network operators. An LCS client may obtain a location estimate for a terminal if the terminal has a location service subscription with a home network, the LCS client has a client subscription with a requesting network, and there is a business agreement between the home network and the requesting network, if these are different networks. The terminal is typically provisioned with location services through the home network operator and may only be able to obtain location services via networks operated by the home network operator or covered by roaming agreement with the home network operator. These restrictions may limit provision of location services in many instances.

In an aspect, location center 130 may support network independent LCS and allow terminals to obtain location services without relying on support of location services by home and serving networks. A location provider that operates or leases location center 130 may or may not be a network operator and may be an ISP, a VoIP Service Provider (VSP), some other service provider, or simply a provider of only location services. A terminal may have an LCS subscription with any location provider and is not limited to its home network operator. An LCS client may also have an LCS subscription with any location provider and is not limited to a network operator. Location center 130 may manage user subscription for both LCS clients and LCS targets, provide location services, manage user privacy, and/or perform other functions. Location center 130 may communicate with the LCS clients and LCS targets using Internet Protocol (IP), Transmission Control Protocol/IP (TCP/IP), User Datagram Protocol (UDP), Short Message Service (SMS), Hypertext Transfer Protocol (HTTP), Session Initiation Protocol (SIP), Mobile Location Protocol (MLP), and/or other data communication means supported by wireless and/or wireline networks.

Figure 2:
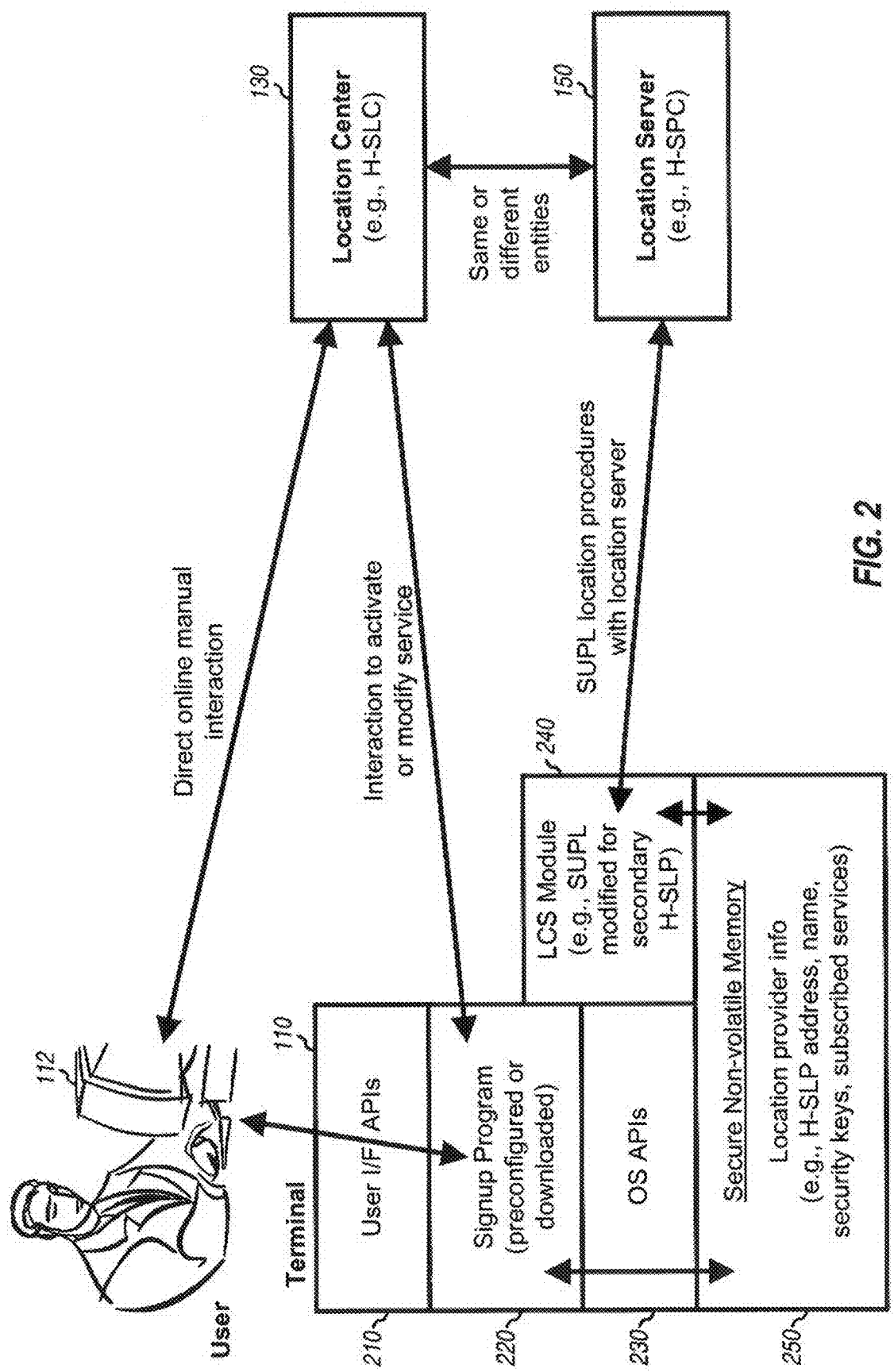
FIG. 2 shows a terminal supporting network independent LCS.

FIG. 2 shows an exemplary block diagram of a design of terminal 110, which supports network independent LCS. In this design, terminal 110 includes user interface (I/F) Application Programming Interfaces (APIs) 210, a signup program 220, operating system (OS) APIs 230, an LCS module 240, and a secure non-volatile memory 250. Terminal 110 may also include other modules and programs as well as a non-secure non-volatile memory for less critical data in order to increase storage capacity and reduce cost. User interface APIs 210 support interacting with a user via a display screen (not shown) and/or a separate computer 112. Computer 112 may communicate with terminal 110 and/or location center 130 via HTTP, Secure HTTP (HTTPS), etc. Computer 112 may be separate from terminal 110 or part of terminal 110.

Signup program 220 assists establishment of an account for terminal 110 with location center 130. Signup program 220 may be preconfigured in terminal 110, downloaded by the user from a location provider website, downloaded by a service provider (e.g., the home network operator), downloaded by a service provider using OMA Device Management, transferred or downloaded from some other device (e.g., a PC, laptop, or PDA), copied from a passive storage device (e.g., diskette, hard drive, CD-ROM, DVD-ROM, or flash memory card), or installed in terminal 110 in some other manner. Signup program 220 may be supported in software, firmware, hardware or any combination of these. Signup program 220 may be separate from other terminal applications, programs, processes and operating system or may be combined with one or more of these. Signup program 220 may be common to different types of terminal, e.g., due to use of known common APIs 210 and 230 which manage different terminal resources (e.g., screen, keyboard, memory, and network signaling interface) in a uniform manner for different terminal types. Signup program may also be unique or special to terminal 110, e.g., may be part of the capabilities provided by the terminal manufacturer or by some source provider to the terminal manufacturer. Signup program 220 may be applicable for a specific location provider and may be customized to ensure correct interaction of the program with location center 130 during a signup procedure to establish the account. Alternatively, signup program 220 may be applicable for different location providers and may support a common signup procedure for all location providers or a different signup procedure for each location provider. Signup program 220 may be activated by the user, e.g., by clicking on an icon on the display of terminal 110, by responding to a menu prompt, via computer 112, etc.

When activated, signup program 220 may read the current setup state for all location providers in terminal 110 and delete or modify any conflicting setup information (e.g., after prompting the user to confirm). Signup program 220 may prompt the user to confirm the location provider being accessed or to provide or select the location provider if the program supports multiple location providers. Signup program 220 may interact with the user via APIs 210 in order to transfer information to and from the user as part of signup to the location provider. Signup program 220 may communicate with computer 112 to exchange information, as described below. Signup program 220 may also access and interact with location center 130 via secure communication to securely transfer user information and terminal information to location center 130 and to receive location provider information (e.g., identity, location center address, authentication keys, etc.) from location center 130. The secure communication may be based on HTTPS, TCP/Transport Layer Security (TCP/TLS), etc. Signup program 220 may prompt the user to enter or confirm pertinent information such as name, email address, credit card information, desired privacy, desired services, etc. Signup program 220 may also access user information from location center 130, which may obtain this information via a separate online setup procedure performed by the user. Signup program 220 may confirm completion of service activation to the user.

Signup program 220 may access resources and capabilities supported by terminal 110 by interacting with the operating system of terminal 110 (which may be Sun Microsystems JAVA, Qualcomm BREW, Microsoft Windows Mobile, Symbian, Google Android, etc.) via APIs 230 provided by the operating system. Signup program 220 may retrieve information from and write information to secure non-volatile memory 250 via APIs 230. Signup program 220 may also modify and/or add to location provider information associated with a specific location solution such as SUPL via APIs 230. For example, signup program 220 may create a new address and security keys for a home SLP (H-SLP) to support SUPL. LCS module 240 may support location services for terminal 110 and may support SUPL and/or other location solutions. In the description of various signup schemes disclosed herein, references are sometimes made to terminal 110 as the source or recipient of different actions and events. This is intended to simplify the description, and signup program 220 may be the ultimate source or recipient of any such action or event (e.g., assisted by services supported by APIs 210 and/or APIs 230).

Figure 3:
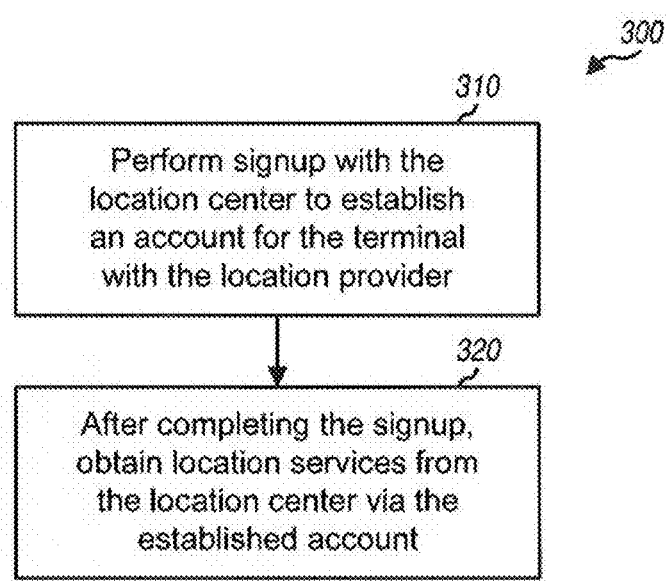
FIG. 3 shows a process for network independent LCS.

FIG. 3 shows a process 300 performed by terminal 110 for network independent LCS. Terminal 110 may perform signup with location center 130 to establish an account for the terminal with the location provider (block 310). The signup may be performed once and based on any of the signup schemes described below. The signup allows the location provider to obtain pertinent information for terminal 110, enables the location provider to locate terminal 110, and allows the location provider to service location requests from the terminal. The signup also provides terminal 110 with pertinent information for the location provider, enables the terminal to make location requests to the location provider, and allows the terminal to respond to location requests from the location provider. The location provider may become a primary (only) H-SLP for SUPL or it may become a secondary H-SLP for SUPL in order to avoid disturbing primary SUPL service with the home network.

After completing signup, terminal 110 may obtain location services from location center 130 via the established account (block 320). Terminal 110 may perform registration with location center 130 after signup, while obtaining location services, or after completing location services. Terminal 110 may provide its IP address to location center 130 for registration. LCS Client 140 may also obtain location services from location center 130 in order to obtain location information for terminal 110.

The user of terminal 110 may sign up with the location provider as an LCS target and/or an LCS client. Signup as an LCS target allows the location of terminal 110 to be determined and provided to terminal 110 and/or other LCS clients. Signup as an LCS client allows terminal 110 to obtain location estimates for other terminals. Security and privacy may be supported to allow the location of terminal 110 to be determined and provided only when authorized.

Figure 4:
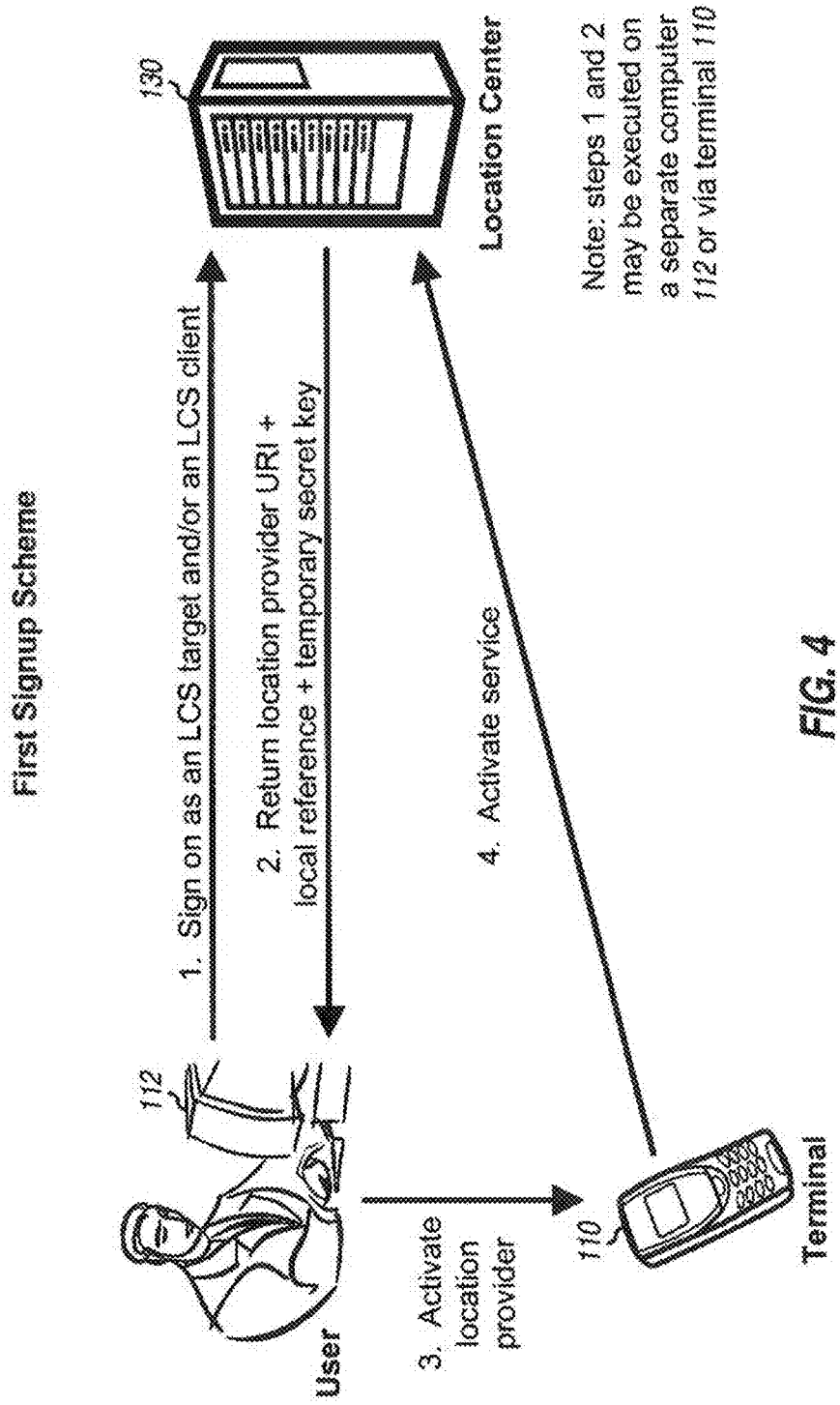
FIGS. 4, 5, 6, 7, 8, and 9 show six signup schemes to establish an account for the terminal with a location center for location services.

FIG. 4 shows a design of a first signup scheme for network independent LCS. The user of terminal 110 may access and communicate with location center 130 via HTTP, HTTPS, etc. The user may establish service with the location provider as an LCS target and/or an LCS client (step 1). The user may provide no information for terminal 110 and may obtain login and password information and setup location privacy rules. Location center 130 may return information such as a Uniform Resource Identifier (URI) for the location provider, a local reference, a temporary secret key, etc. (step 2). The location provider URI may be an IP address, a Fully Qualified Domain Name (FQDN), or some other information used to reach location center 130. The local reference may be used as a temporary ID for the signup. The temporary secret key may be used for security functions described below. Location center 130 may send all of the information in a single alphanumeric string, e.g., a string of 10 to 25 digits or characters that is short enough to be managed by the user, e.g., written down, typed in, etc. Steps 1 and 2 may be performed from a separate computer 112 (as shown in FIG. 4) or via terminal 110 (not shown in FIG. 4). The user may activate signup program 220 on terminal 110 (e.g., using a special menu function) and may enter the location provider URI and other information received from location center 130, e.g., when prompted by signup program 220 or as unprompted input to signup program 220 (step 3). Terminal 110 may store the information in its secure non-volatile memory 250, e.g., as directed by signup program 220.

Terminal 110 may then access location center 130 to activate service (step 4). Terminal 110 may provide the local reference received in step 2 to identify the user to location center 130. Terminal 110 may perform mutual authentication with the temporary secret key to authenticate location center 130 to terminal 110 and to authenticate terminal 110 to location center 130. The mutual authentication may be based on Pre-Shared Key-TLS (PSK-TLS) authentication or some other security protocol. After completing the mutual authentication, terminal 110 may provide its public identity information, which may be a Mobile Directory Number (MDN), a Mobile Station International ISDN Number (MSISDN), a public user SIP URI, etc. Location center 130 may provide its identity (e.g., a name) and a permanent URI to terminal 110. Location center 130 and terminal 110 may also negotiate a permanent secret key (e.g., using a Diffie-Hellman key exchange). Terminal 110 may store the permanent secret key in secure non-volatile memory 250 and may use this secret key for future authentications with location center 130. Terminal 110 may perform deactivation of location service with location center 130 (e.g., at the instigation of the user) by performing steps similar to steps 3 and 4. For all signup schemes, deactivating location service and removing information related to the account between terminal 110 and location center 130 may be accomplished using steps similar to those used for signup.

For the first signup scheme, security properties are as follows. Steps 1 and 2 may be performed in a secured manner. The user may know the true identity of the location provider, and HTTPS may be used to securely return the temporary secret key and the local reference in step 2. Step 3 may not be secure since someone other than the real user could perform steps 1 and 2 and then obtain temporary access to terminal 110. This may be circumvented by (i) prominently displaying the name of the location provider (e.g., on a welcome screen of terminal 110) so that the real user can become aware and (ii) alerting the user to reconfirm activation (e.g., periodically) on terminal 110. Step 4 should be as secure as steps 1 and 2. Terminal 110 (or signup program 220) may provide menus and functions to support provider activation in step 3 and service activation in step 4.

Figure 5:
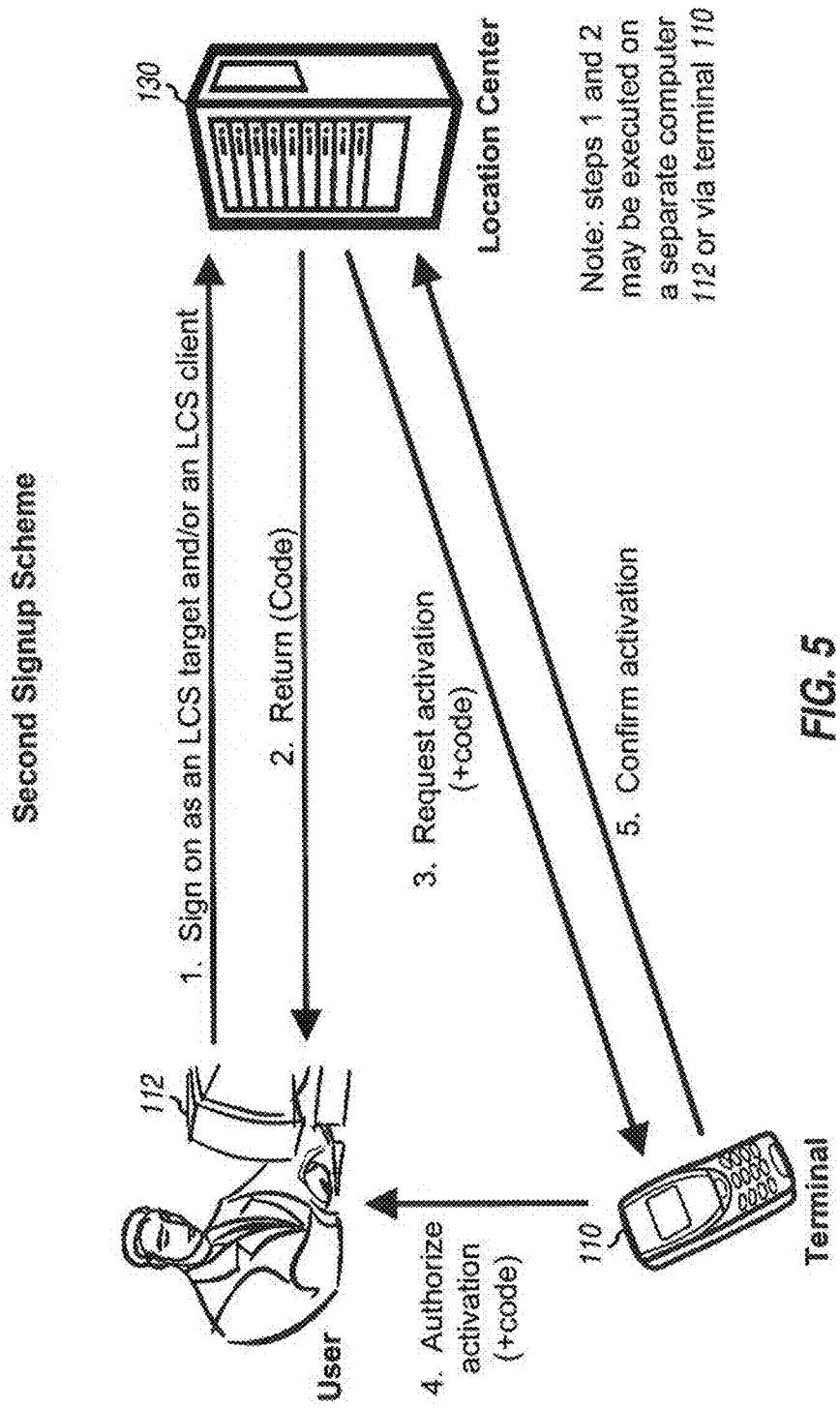

FIG. 5 shows a design of a second signup scheme for network independent LCS. The user of terminal 110 may establish service with the location provider as an LCS target and/or an LCS client (step 1). The user may provide the MDN, MSISDN or public user SIP URI for terminal 110 and may obtain login and password information and setup location privacy rules. Location center 130 may return a code for later authentication (step 2).

Location center 130 may then send a request for service activation to terminal 110 (step 3). This request may be sent using an SMS message that contains the location provider name, the URI, and possibly the code provided in step 2. Terminal 110 may alert the user to authorize the service activation (possibly at a later time) (step 4). Terminal 110 may display the location provider name and possibly the code for authentication and may request the user to authorize service activation. If service activation is authorized by the user, then terminal 110 may confirm the service activation to location center 130 (step 5). Location center 130 may provide a permanent URI to terminal 110. Terminal 110 may authenticate the location provider identity, e.g., using a public root key certificate for location center 130. Location center 130 and terminal 110 may negotiate a common secret key for future authentication, and terminal 110 may store this secret key in secure non-volatile memory 250 for future authentications. Terminal 110 may provide confirmation of service activation to the user in either step 4 or following step 5.

For the second signup scheme, security properties are as follows. Steps 1 and 2 may be performed in a secured manner, e.g., the user may know the true identity of the location provider. Step 3 may not need to be secure since service is not yet activated. Step 4 may not be secure since someone else may obtain temporary access to terminal 110. However, the delay between steps 1 and 2 and steps 3 and 4 may make this less likely, particularly if the location provider or terminal ensures this delay is not small (e.g., ensures a delay of an hour or a day). This is because someone who had obtained temporary access to terminal 110 would need to retain access in order to complete steps 4 and 5 (given that the real user would see step 4 as an unexpected event and would most likely not allow it to proceed). The main risk from steps 3 and 4 may be a request for service activation from another location provider not accessed by the user in steps 1 and 2. To protect against this, in step 4, the user may be requested to enter the code received in step 2 rather than to verify the code displayed by terminal 110. The code provided in step 2 may then be used for mutual authentication between terminal 110 and the location provider. In step 5, terminal 110 may verify the location provider identity using the public root key certificate. Terminal 110 (or signup program 220) may provide menus and functions to support user activation in step 4 and service activation in steps 3 and 5.

Figure 6:
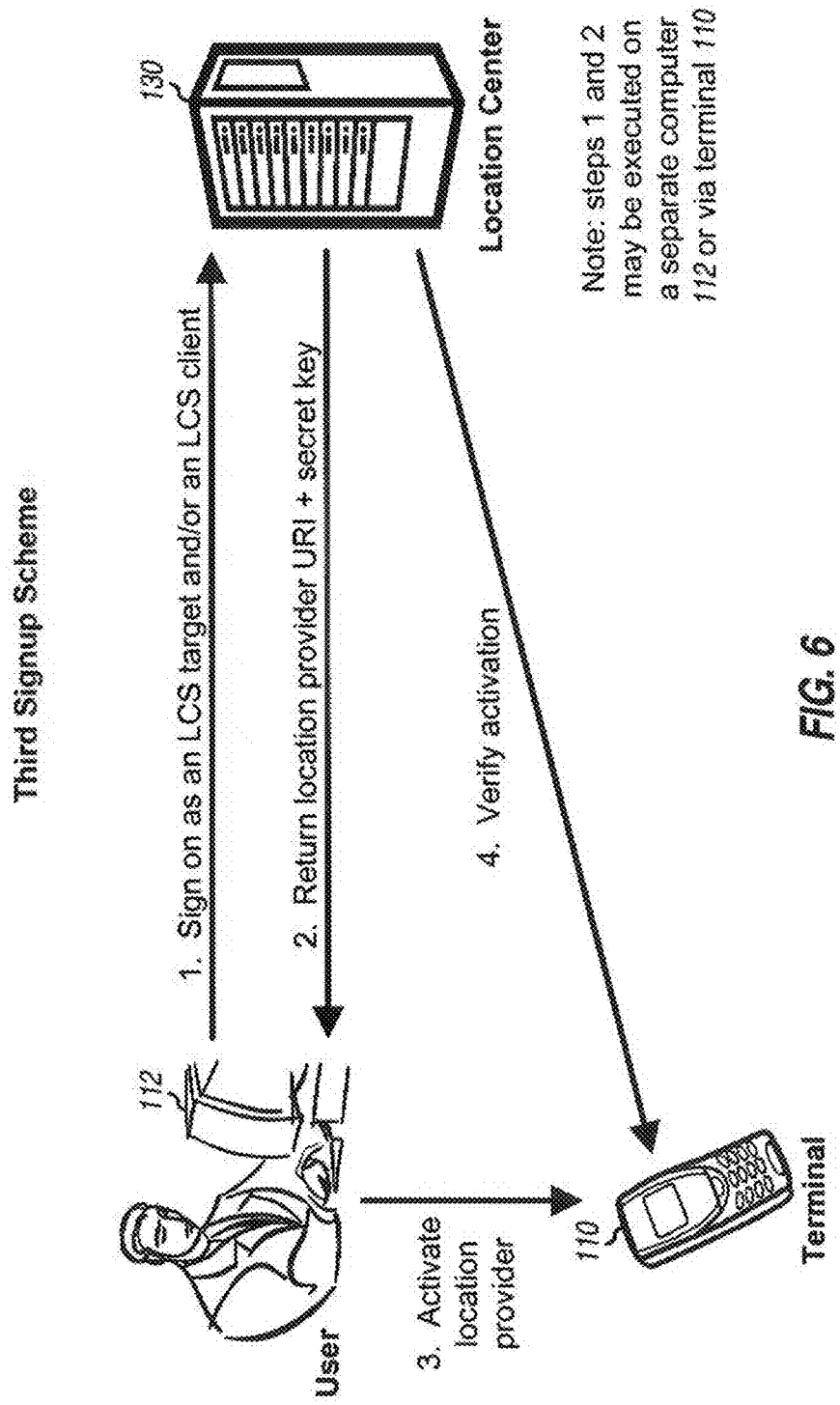

FIG. 6 shows a design of a third signup scheme for network independent LCS. The user of terminal 110 may establish service with the location provider as an LCS target and/or an LCS client (step 1). The user may provide the user's name, postal address, email address, possibly credit card number, MDN, MSISDN or public user SIP URI of terminal 110, etc. The user may obtain login and password information and setup location privacy rules. Location center 130 may return the location provider URI (e.g., an IP address) and a secret key (step 2). The user may activate the location provider on terminal 110 (e.g., using a special menu function) and may enter the location provider URI and other information received from location center 130 (step 3). Terminal 110 may store the information in secure non-volatile memory 250.

Location center 130 may verify activation at a later time (e.g., one or more days later) and may send a location request (e.g., an MT-LR) using SUPL for the verification (step 4). The verification may test the association of the MDN, MSISDN or public user SIP URI provided in step 1 to the secret code returned in step 2. The activation in step 3 may be considered to be verified if location center 130 is able to access terminal 110 using the MDN, MSISDN, or public user SIP URI, authenticate terminal 110 using the secret key, and obtain a location estimate. If the activation is verified, then location center 130 or terminal 110 may alert the user. If the verification is not successful, then location center 130 may inform the user, e.g., via an email sent to the email address provided in step 1. Security properties for the third signup scheme may be as described above for the first signup scheme in FIG. 4 in order to ensure secure activation.

Figure 7:
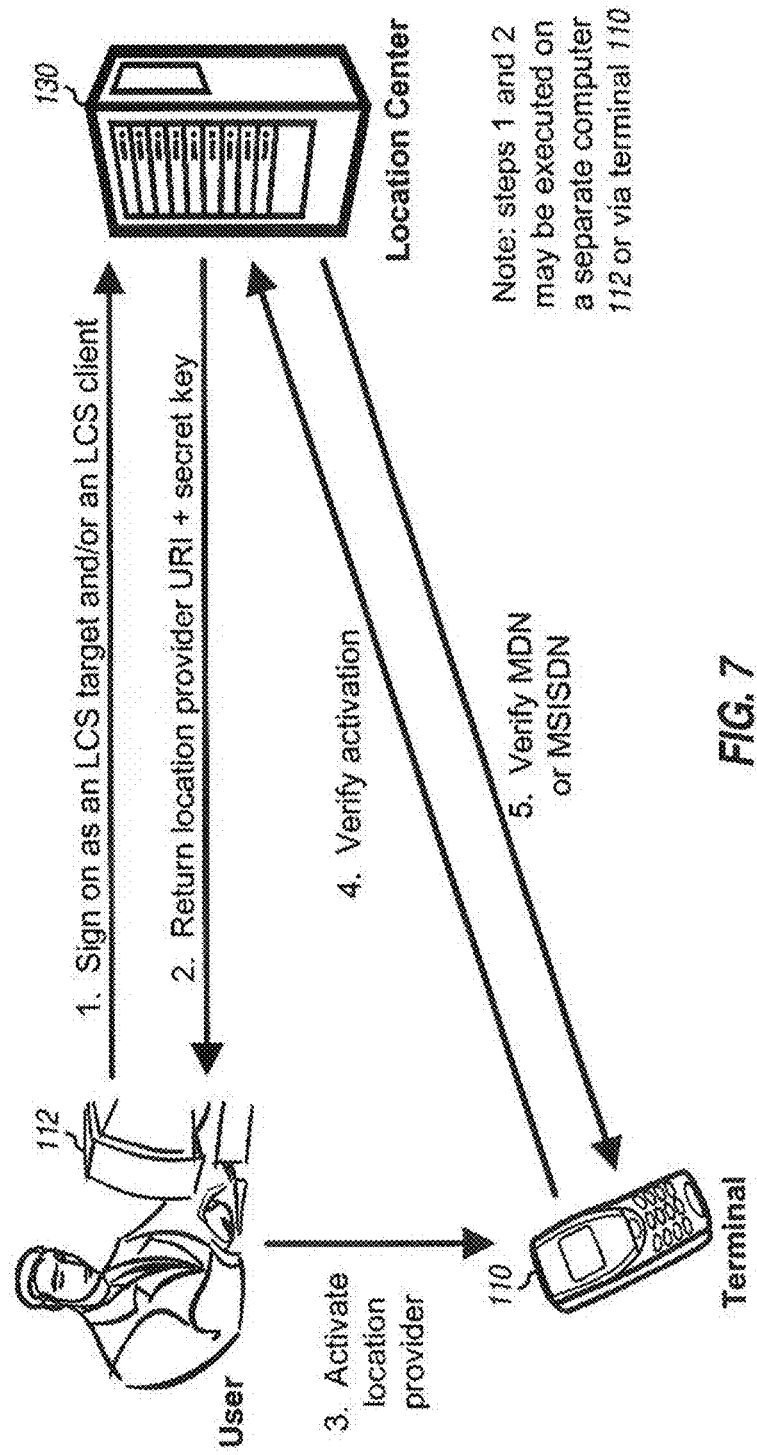

FIG. 7 shows a design of a fourth signup scheme for network independent LCS. Steps 1, 2 and 3 in the fourth signup scheme may be performed as described above for steps 1, 2 and 3 in the third signup scheme. Terminal 110 may verify activation (step 4). The verification may be a location request (e.g., an MO-LR) using SUPL directed to location center 130. The verification may test the association of terminal 110 to the secret code returned in step 2. The activation in step 3 may be considered to be verified if terminal 110 is able to authenticate location center 130 using the secret key and obtain a location estimate. Terminal 110 may also confirm the activation to the user. Location center 130 may also verify the MDN, MSISDN or public user SIP URI provided in step 1, e.g., by instigating a location request (e.g., MT-LR) to terminal 110. Security properties for steps 1, 2 and 3 in the fourth signup scheme may be as described above for steps 1, 2 and 3 in the first signup scheme in FIG. 4 in order to ensure secure activation. Steps 4 and 5 in the fourth signup scheme may be as secure as steps 1 and 2 in this scheme.

Figure 8:
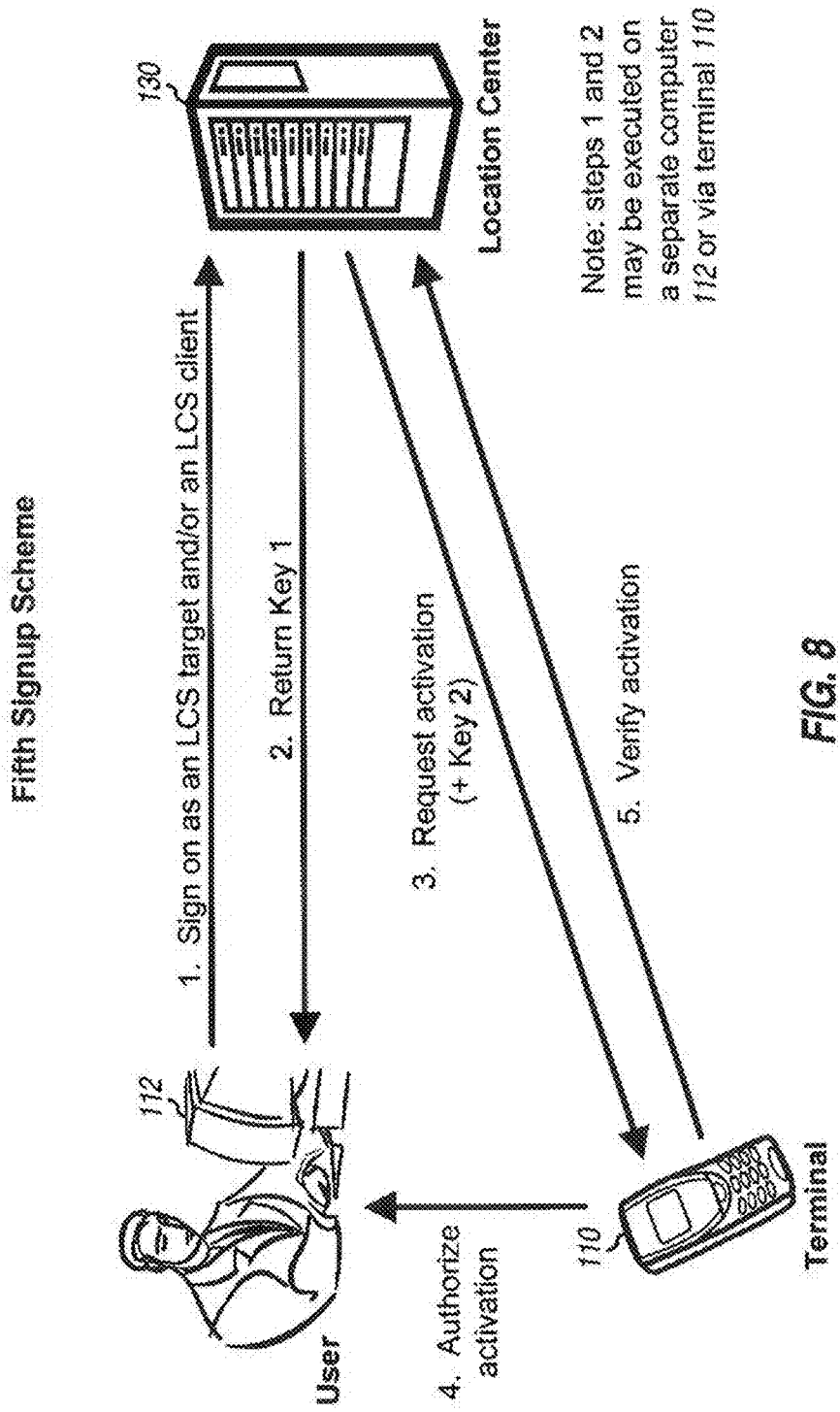

FIG. 8 shows a design of a fifth signup scheme for network independent LCS. The user of terminal 110 may establish service with the location provider as an LCS target and/or an LCS client (step 1). The user may provide the MDN, MSISDN or public user SIP URI of terminal 110 and may obtain login and password information and setup location privacy rules. Location center 130 may return a first secret key (Key 1) (step 2) and may send a request for service activation to terminal 110 (step 3). Step 3 may occur immediately after step 2 or at a later time. The request may be sent in an SMS message or some other message (e.g., MMS, IM) containing the location provider name, location provider URI, and a second secret key (Key 2).

Terminal 110 may alert the user to authorize the service activation (step 4). Terminal 110 may display the location provider name and obtain Key 1 from the user. If the service activation is authorized by the user, then terminal 110 may verify the service activation with location center 130 (step 5). As part of step 5, Key 1 and Key 2 may be combined into a permanent secret key K. As a further part of step 5, terminal 110 may perform an MO-LR location request (e.g., using SUPL) using the secret key K for mutual authentication. If mutual authentication succeeds using the secret key K and a location estimate is obtained, then the service activation in step 3 may be considered to be verified by both terminal 110 and location center 130. Terminal 110 may confirm service activation to the user in step 4 or following step 5.

Security properties for steps 1, 2, 3 and 4 in the fifth signup scheme may be as described above for steps 1, 2, 3 and 4 in the second signup scheme in FIG. 5 in order to ensure secure activation. Step 5 should be secure since the secret key K is obtained from two separate interactions. This prevents a request for service activation from another location provider not accessed by the user in steps 1 and 2.

In the first through fifth signup schemes, the user may sign up for service as an LCS target and/or an LCS client with the location provider by accessing location center 130 via the Internet using TCP/IP, HTTP, HTTPS, or some other means. The user may provide pertinent information such as the user name, postal address, email address, billing information, public identity information for terminal 110, etc. For signup as an LCS target, pertinent information may be provided to and stored by terminal 110 so that it can interact correctly with location center 130 in order to allow the terminal's location to be obtained when requested by the user or some other LCS client.

The first through fifth signup schemes each includes separate setup and activation portions. For the setup portion, a user account is created in location center 130 and may include user information such as user name, postal address, email address, billing details, privacy preferences, subscribed location services, MDN, MSISDN or public user SIP URI of terminal 110, etc. For the activation portion, information about the location provider is configured in terminal 110, and information about terminal 110 (e.g., the MDN, MSISDN or public user SIP URI) may be provided to location center 130. Information may be stored in both terminal 110 and location center 130 to enable mutual authentication when terminal 110 and location center 130 later interact for location services. A particular location solution (e.g., SUPL) may be enabled for use between terminal 110 and location center 130 to support location services.

The setup portion involves information transfer between the user and location center 130 and may be performed by a separate online connection (e.g., via the Internet), as shown in FIGS. 4 through 8. The activation portion involves information transfer between terminal 110 and location center 130 and interaction between the user and terminal 110. The setup and activation portions may be combined.

Figure 9:
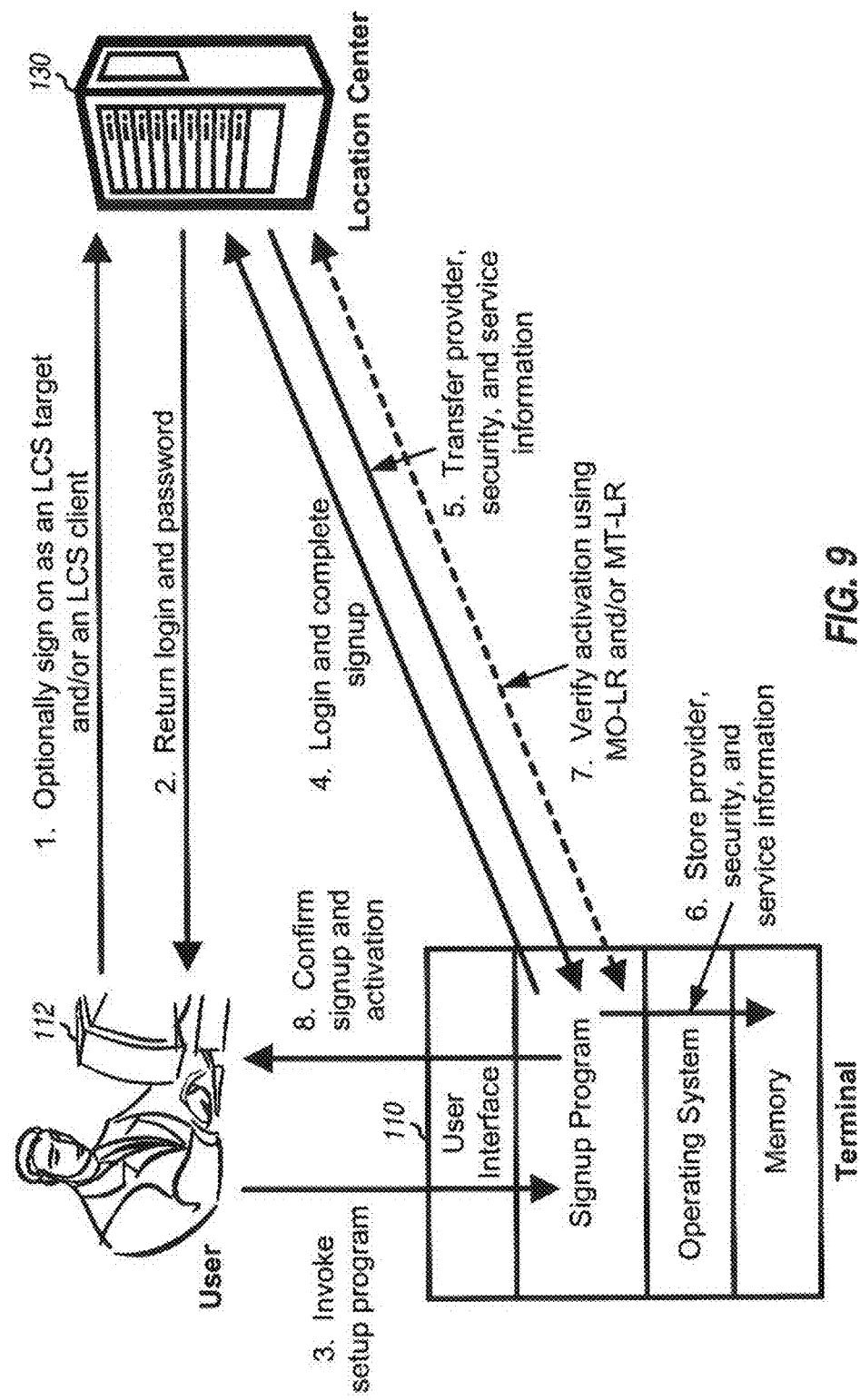

FIG. 9 shows a design of a sixth signup scheme for network independent LCS. Optionally, the user of terminal 110 may establish service with the location provider using a separate online access (e.g., from computer 112) (step 1), and location center 130 may return login and password information to enable future user access to the location provider (step 2). The user of terminal 110 may invoke signup program 220 on the terminal (e.g., via a menu function) or may first download the signup program from location center 130 to terminal 110 or first obtain signup program 220 in some other way and then invoke the signup program (step 3). Signup program 220 may guide the user through the signup procedure (step 4). If steps 1 and 2 were not performed, then signup program 220 may access location center 130 and help guide the user through the signup portion of steps 1 and 2. If steps 1 and 2 were performed, then signup program 220 may assist the user to login to location center 130 using the login and password information received in step 2. The user may add more signup information and/or change existing signup information. Signup program 220 may access and interact with location center 130 using any secure TCP/IP or UDP/IP related protocol such as HTTPS or TLS. The login and password information may be used to help establish secure communication. Signup program 220 may provide public identity information (e.g., the MDN, MSDISDN or public user SIP URI), the location solutions supported by terminal 110, and/or other information to location center 130.

Location center 130 may provide location provider information, security information, service information, and/or other information to signup program 220 (step 5). The location provider information may include location provider name and address (e.g., URI or IP address). The security information may include authentication and ciphering keys to enable mutual authentication and secure communication between terminal 110 and location center 130 for future location requests. The service information may include privacy preferences and/or other information for the user. Other information may include location solution(s) supported by the location provider. Signup program 220 may store the information received in step 5 in secure non-volatile memory 250 within terminal 110 for later use for location services (step 6). Signup program 220 may optionally invoke an MO-LR (e.g., using SUPL) to obtain a location estimate for terminal 110 to verify that the location solution will now work correctly with the location provider (step 7). Location center 130 may similarly invoke an MT-LR (e.g., using SUPL) to obtain a location estimate for terminal 110 to verify correct operation. Signup program 220 may confirm that setup and activation are complete to the user (step 8).

If signup program 220 is provided by the location provider (e.g., downloaded from a location provider website or supplied by the location provider to any provider of programs and features for terminal 110), then it may be possible to use communication procedures that the location provider prefers between signup program 220 and location center 130 in steps 4, 5 and 7. In particular, it may be possible to employ reliable means of authentication and ciphering and flexible and extensible means of transferring data between signup program 220 and location center 130. It may further be possible to make interaction between the user and signup program 220 in steps 3 and 8 simple and user friendly from the user perspective. These effects may also be achieved if signup program 220 is not provided by the location provider if the interface and procedures used between signup program 220 and location center 130 are provided, e.g., standardized or otherwise publicly available. The sixth signup scheme may be more suitable for cases where the location provider provides signup program 220 whereas the first through fifth signup schemes may be more suitable where signup program 220 is not provided by the location provider. However, all signup schemes may be used regardless of whether signup program 220 is provided by the location provider or by some other source.

For the sixth signup scheme, security properties are as follows. Steps 1 and 2 (if performed) may be secure, e.g., the user may know the true identity of the location provider, and HTTPS may be used to securely return the login and password information in step 2. Step 3 is not secure and may be circumvented as described above for the first signup scheme. Steps 5 to 8 may be secure due to use of a secure IP protocol (e.g., HTTPS or TLS) between terminal 110 and location center 130.

In a seventh signup scheme, the location provider may be preconfigured (e.g., as the primary or secondary H-SLP) in terminal 110. This preconfiguration may avoid a setup and activation procedure between terminal 110 and location center 130 since location provider information (e.g., H-SLP address, authentication parameters, etc.) can already be stored in secure non-volatile memory 250 within terminal 110. The service may be pre-activated and ready to use or may be activated by the user via a menu function or other command on terminal 110. The location provider may be changed and/or other location providers may be added later via any of the signup schemes described above.

The signup schemes described above support portability of location services. The user may change home network operator, retain the same MDN or MSISDN due to number portability, and continue to obtain location services from the same location provider. SMS transfer of a SUPL INIT message would continue to work due to number portability (provided that SMS portability enhancement is supported). Other aspects of location services would continue to apply because the service is not tied to the home network operator.

In general, terminal 110 and location center 130 may utilize any location solution to obtain and provide location estimates for terminal 110 to LCS clients and/or to terminal 110, to obtain and provide location estimates for LCS targets to terminal 110, to provide assistance data to help terminal 110 determine its own location, etc. In one design, SUPL may be used to support all of the above functions. SUPL can take advantage of IP capability of location center 130, shared secret key established during service activation for mutual authentication, and, as an extension to SUPL, capability of the terminal to register its current IP address in an H-SLP.

Location center 130 may support SUPL and may perform additional functions to (i) create user accounts via the signup procedure described above and (ii) activate SUPL use in terminals via the signup procedure. Location center 130 may act as an H-SLP with respect to terminal 110. If terminal 110 already has a primary H-SLP in the home network, then the location provider may become a secondary H-SLP in order to allow use of SUPL for both the home network and the location provider. If terminal 110 has both a primary H-SLP and a secondary H-SLP, then an MT-LR request from either the primary or secondary H-SLP to obtain the location of terminal 110 on behalf of an LCS client may be supported in the manner currently defined for SUPL. In the case of a request by terminal 110 (e.g., instigated by the user or an application on terminal 110) for the location of terminal 110 or the location of some other terminal, terminal 110 (or the instigating user or application) may decide whether to send the request to the primary or secondary H-SLP using defined SUPL procedures.

Referring back to FIG. 2, LCS module 240 may access location provider information (e.g., H-SLP address, primary and secondary H-SLP addresses, security keys, subscribed services, etc.) in secure memory 250, which may have been placed there earlier by any of the signup schemes described above. LCS module 240 may be part of (e.g., an extension to) signup program 220, in which case LCS module 240 may know how to access particular location provider information in secure memory 250 by employing the same access routines in the same way as signup program 220. When LCS module 240 is part of signup program 220 and has been provided by the location provider, it may also be possible to use any location solution and set of associated location procedures between terminal 110 and location server 150 (e.g., not necessarily a standardized solution like SUPL), which may be convenient (e.g., reduce cost) for the location provider. If signup program 220 and LCS module 240 are separate (e.g., provided by different sources), then known capabilities of OS APIs 230 may be used to enable common access. In addition, common access may be assisted by known conventions provided in specifications defining OS APIs 230 (e.g., conventions that define particular parameter values and/or particular parameter names that refer to particular types of location provider information).

Figure 10:
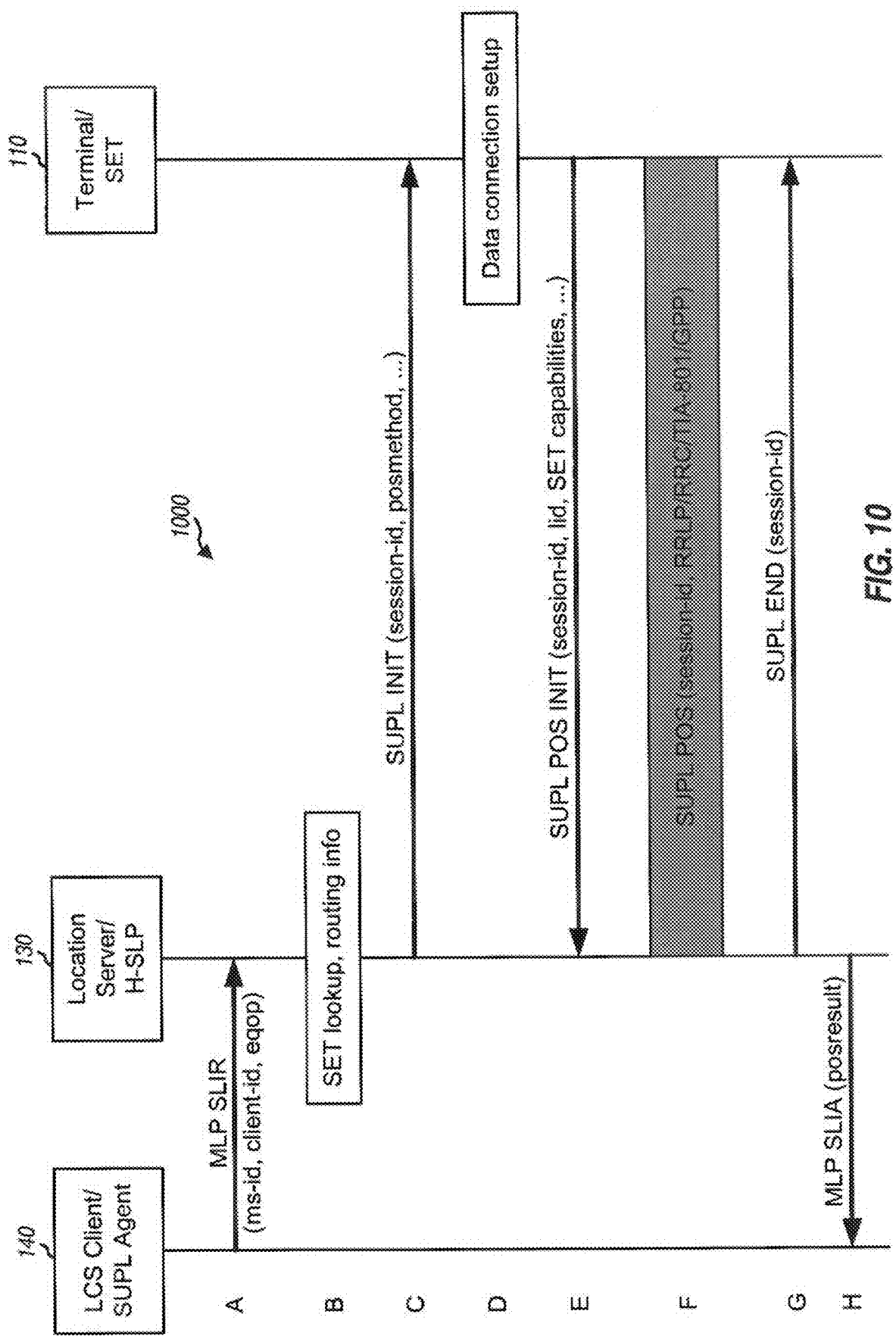
FIG. 10 shows a process for network-initiated location service in SUPL.

FIG. 10 shows a message flow 1000 for network-initiated location service in SUPL. Message flow 1000 may be used for block 320 in FIG. 3. In SUPL, terminal 110 may be referred to as a SUPL Enabled Terminal (SET), location center 130 may be referred to as an H-SLP, and LCS client 140 may be referred to as a SUPL Agent.

LCS client 140 may desire location information for terminal 110 and may send an MLP Standard Location Immediate Request (SLIR) message to location center 130 (step A). Location center 130 may authenticate and authorize LCS client 140 for the requested location information. Location center 130 may then obtain routing information for terminal 110, which is the LCS target (step B).

Location center 130 may send a SUPL INIT message to initiate a location session with terminal 110 (step C). The SUPL INIT message may be sent using SMS, WAP Push, SIP Push, or UDP/IP or TCP/IP transfer if terminal 110 has performed registration with location center 130 and provides its IP address to the location center. The SUPL INIT message may include a session-id used to identify the location session, an intended positioning method (posmethod), the desired quality of positioning (QoP), etc. Upon receiving the SUPL INIT message, terminal 110 may perform a data connection setup procedure, attach itself to a packet data network if the terminal is not already attached, and establish a secure IP connection to location center 130 (step D). Terminal 110 may send a SUPL POS INIT message to location center 130 (step E). The SUPL POS INIT message may include the session-id, the terminal capabilities (e.g., supported positioning methods and protocols), etc. Terminal 110 may authenticate location center 130 in step C, and location center 130 may authenticate terminal 110 in step E based on PSK-TLS using the shared secret key (SSK) established during signup.

Terminal 110 may then exchange messages with location center 130 and/or location server 150 for a positioning session, which may be based on IS-801, Radio Resource LCS Protocol (RRLP), Radio Resource Control (RRC), Generic Positioning Protocol (GPP), etc. (step F). For SET-assisted positioning, location center 130 or location server 150 may calculate a location estimate for terminal 110 based on positioning measurements received from the terminal. For SET-based positioning, terminal 110 may calculate the location estimate based on assistance from location center 130 or location server 150. In any case, upon completing the positioning session, location center 130 may send a SUPL END message to terminal 110 (step G) and may also send the requested location information in an MLP Standard Location Immediate Answer (SLIA) message to LCS client 140 (step H).

FIG. 11 shows a message flow 1100 for SET-initiated location service in SUPL. Message flow 1100 may also be used for block 320 in FIG. 3. An LCS client on terminal 110 may receive a request for location information from an application running on the terminal. Terminal 110 may perform a data connection setup procedure, attach itself to a packet data network if necessary, and establish a secure IP connection to location center 130 (step A). Terminal 110 may then send a SUPL START message to initiate a location session with location center 130 (step B). The SUPL START message may include a session-id, the terminal capabilities, etc. Location center 130 may obtain routing information for terminal 110 (step C) and then send to terminal 110 a SUPL RESPONSE message that may include the session-id, a selected positioning method, etc. (step D). Terminal 110 may return a SUPL POS INIT message that may include the session-id and possibly other information (step E). Terminal 110 may then exchange messages with location center 130 and/or location server 150 for a positioning session (step F). Upon completing the positioning session, location center 130 may send a SUPL END message with the requested location information to terminal 110 (step G).

Message flows 1000 and 1100 as well as other aspects of SUPL are described in OMA-AD-SUPL-V1, entitled "Secure User Plane Location Architecture," dated Jun. 15, 2007, in OMA-TS-ULP-V1, entitled "UserPlane Location Protocol," dated Jun. 15, 2007, in OMA-AD-SUPL-V2, entitled "Secure User Plane Location Architecture," dated Aug. 31, 2007, and in OMA-TS-ULP-V2, entitled "UserPlane Location Protocol," dated Feb. 6, 2008. These SUPL documents are publicly available from OMA.

As shown in FIGS. 10 and 11, a Generic Positioning Protocol (GPP) may be used for the positioning session in step F. GPP may support various access types and may be more suitable for network independent LCS to allow terminal 110 to obtain location services via any wireless and/or wireline network. Access-specific positioning protocols such as RRLP, RRC, and IS-801 may also be supported and may be more suitable for GPS and GNSS.

Network independent LCS may be used for various applications. For example, network independent LCS may be used to obtain location estimates for various purposes, to receive notification of events and opportunities based on current location, to track items or people (e.g., children), etc.

FIG. 12 shows a design of a process 1200 for supporting network independent LCS. Process 1200 may be performed by location center 130 or some other entity. The location center may communicate with a terminal to establish an account for the terminal with the location center for location services (block 1212). The location center may establish the account for the terminal independent of a home network for the terminal. The location center may thereafter provide location services to the terminal based on the established account and without interacting with the home network or a serving network for the terminal (block 1214).

For block 1212, the location center may provide address information (e.g., a URI, an IP address, etc.) for the location center and security information (e.g., at least one secret key) during signup to establish the account. The location center may receive public identity information (e.g., an MDN, an MSDISDN, or a public user SIP URI) for the terminal during the signup. For MT-LR in block 1214, the location center may send a request for location service to the terminal based on the public identity information. For MO-LR in block 1214, the location center may receive a request for location service sent by the terminal based on the address information. For both MT-LR and MO-LR, the location center may establish secure communication with the terminal for the location service based on the security information.

The signup to establish the account may be performed in various manners. For the first signup scheme in FIG. 4, the location center may receive a request to set up the account for the terminal, provide address information for the location center and a secret key in response to the request, receive access by the terminal based on the address information, perform mutual authentication with the terminal based on the secret key, and activate service for the terminal after successful mutual authentication.

For the second signup scheme in FIG. 5, the location center may receive a request to set up the account and public identity information for the terminal, send a request for service activation to the terminal based on the public identity information, and receive a confirmation of service activation from the terminal.

For the third signup scheme in FIG. 6, the location center may receive a request to set up the account and public identity information for the terminal, provide address information for the location center and a secret key in response to the request, send a request for service activation to the terminal based on the public identity information, perform mutual authentication with the terminal based on the secret key, and activate service for the terminal after successful mutual authentication. The request for service activation may be a location request (e.g., an MT-LR), which may simplify implementation since the location request may already be supported as part of normal location services.

For the fourth signup scheme in FIG. 7, the location center may receive a request to set up the account and public identity information for the terminal, provide address information for the location center and a secret key in response to the request, receive a request for service activation sent by the terminal based on the address information, perform mutual authentication with the terminal based on the secret key, and activate service for the terminal after successful mutual authentication. The request for service activation may be a location request (e.g., an MO-LR), which may simplify implementation since the location request may already be supported as part of normal location services.

For the fifth signup scheme in FIG. 8, the location center may receive a request to set up the account and public identity information for the terminal, provide a first secret key in response to the request, send a request for service activation and a second secret key to the terminal based on the public identity information, generate a third secret key based on the first and second secret keys, receive a location request sent by the terminal to activate service, perform mutual authentication with the terminal based on the third secret key, and activate service for the terminal after successful mutual authentication.

For the sixth signup scheme in FIG. 9, the location center may receive a request to set up the account for the terminal, provide login and password information in response to the request, establish secure communication with the terminal based on the login and password information, receive public identity information for the terminal, and send address information for the location center and security information to the terminal.

The signup to establish the account may involve (i) interaction between the location center and the terminal and (ii) possibly interaction between the location center and a separate computer. The signup may also involve steps different from those given above, exchange of additional and/or different information, etc.

FIG. 13 shows a design of a process 1300 for obtaining location services via network independent LCS. Process 1300 may be performed by terminal 110 or some other entity. The terminal may communicate with a location center to establish an account for the terminal with the location center for location services (block 1312). The terminal may establish the account with the location center independent of a home network for the terminal. The terminal may thereafter obtain location services from the location center based on the established account and without interacting with the home network or a serving network for the terminal (block 1314).

For block 1312, the terminal may receive address information (e.g., a URI, an IP address, etc.) for the location center and security information (e.g., at least one secret key) during signup to establish the account. The terminal may securely store the address information and the security information. For MT-LR in block 1314, the terminal may receive a request for location service from the location center. For MO-LR in block 1314, the terminal may send a request for location service to the location center based on the address information. For both MT-LR and MO-LR, the terminal may establish secure communication with the location center for the location service based on the security information.

The signup to establish the account may be performed in various manners. For the first signup scheme in FIG. 4, the terminal may receive address information for the location center and a secret key provided by the location center, access the location center based on the address information, perform mutual authentication with the location center based on the secret key, and activate service with the location center after successful mutual authentication.

For the second signup scheme in FIG. 5, the terminal may receive a request for service activation from the location center, query for user authorization of the service activation, and send a confirmation of service activation to the location center in response to receiving the user authorization.

For the third signup scheme in FIG. 6, the terminal may receive address information for the location center and a secret key provided by the location center, receive a request for service activation (e.g., an MT-LR location request) from the location center, perform mutual authentication with the location center based on the secret key, and activate service with the location center after successful mutual authentication.

For the fourth signup scheme in FIG. 7, the terminal may receive address information for the location center and a secret key provided by the location center, send a request for service activation (e.g., an MO-LR location request) to the location center based on the address information, and perform mutual authentication with the location center based on the secret key, and activate service with the location center after successful mutual authentication.

For the fifth signup scheme in FIG. 8, the terminal may obtain a first secret key via user input, receive a request for service activation and a second secret key from the location center, generate a third secret key based on the first and second secret keys, send a location request to the location center to activate service, perform mutual authentication with the location center based on the third key, and activate service with the location center after successful mutual authentication.

For the sixth signup scheme in FIG. 9, the terminal may obtain login and password information provided by the location center, establish secure communication with the location center based on the login and password information, provide public identity information to the location center, and receive address information for the location center and security information from the location center.

The signup may involve (i) interaction between the terminal and the location center and possibly (ii) interaction between the terminal and a separate computer. The signup may also involve steps different from those given above, exchange of additional and/or different information, etc.

Location server 150 may provide assistance data to terminal 110. The assistance data may be satellite/navigation data to assist terminal 110 with making measurements of satellites, terrestrial assistance data to assist terminal 110 with making measurements for terrestrial stations, e.g., base stations/cells, WLAN access points (APs), etc. Terrestrial assistance data may comprise base station almanac (BSA)

data, which may include information that (i) identifies particular base stations, cells, cell-sectors, WLAN APs and other wireless access entities, (ii) provides details on wireless support by each entity (e.g., radio technology, frequencies and channels used, power output), (iii) provides the location of each entity (e.g., latitude/longitude/altitude, country, state, county, city, street), (iv) provides timing details for each entity (e.g., transmission timing relative to other entities or relative to some absolute time and timing drift), and (v) provides other information that may be useful in making measurements of signals received from these entities to obtain location and in calculating location. The assistance data may be provided for various positioning methods such as GPS, Galileo, GLONASS, Enhanced Observed Time Difference (E-OTD), Observed Time Difference Of Arrival (OTDOA), Advanced Forward Link Trilateration (A-FLT), Enhanced Cell ID (E-CID), etc. The assistance data may be valid for an extended period of time (e.g., days or weeks) and may enable terminal 110 to determine its own location using a suitable positioning method at any time over the extended period of time without any further assistance from location server 150 or any wireless network. The assistance data may also or instead enable terminal 110 to perform measurements of satellite and base station signals without further assistance from location server 150 and to send the signal measurements at any later time to location server 150 or some other entity to provide or obtain location. The capability to provide assistance data may be referred to as eXTended Receiver Assistance (XTRA).

Network independent LCS and XTRA may be used separately or together since they are not mutually dependent. When both are used, they may be provided by the same or different providers (e.g., one location provider may provide XTRA support and another location provider may provide network independent LCS). Combining XTRA with network independent LCS may allow a location provider to support a minimal subset of SUPL in which no positioning protocol (RRLP, RRC or ISA-801) and no SPC are used because the terminal is now able to measure and compute its own location without requiring interaction with a location server using a positioning protocol.

Figure 14:
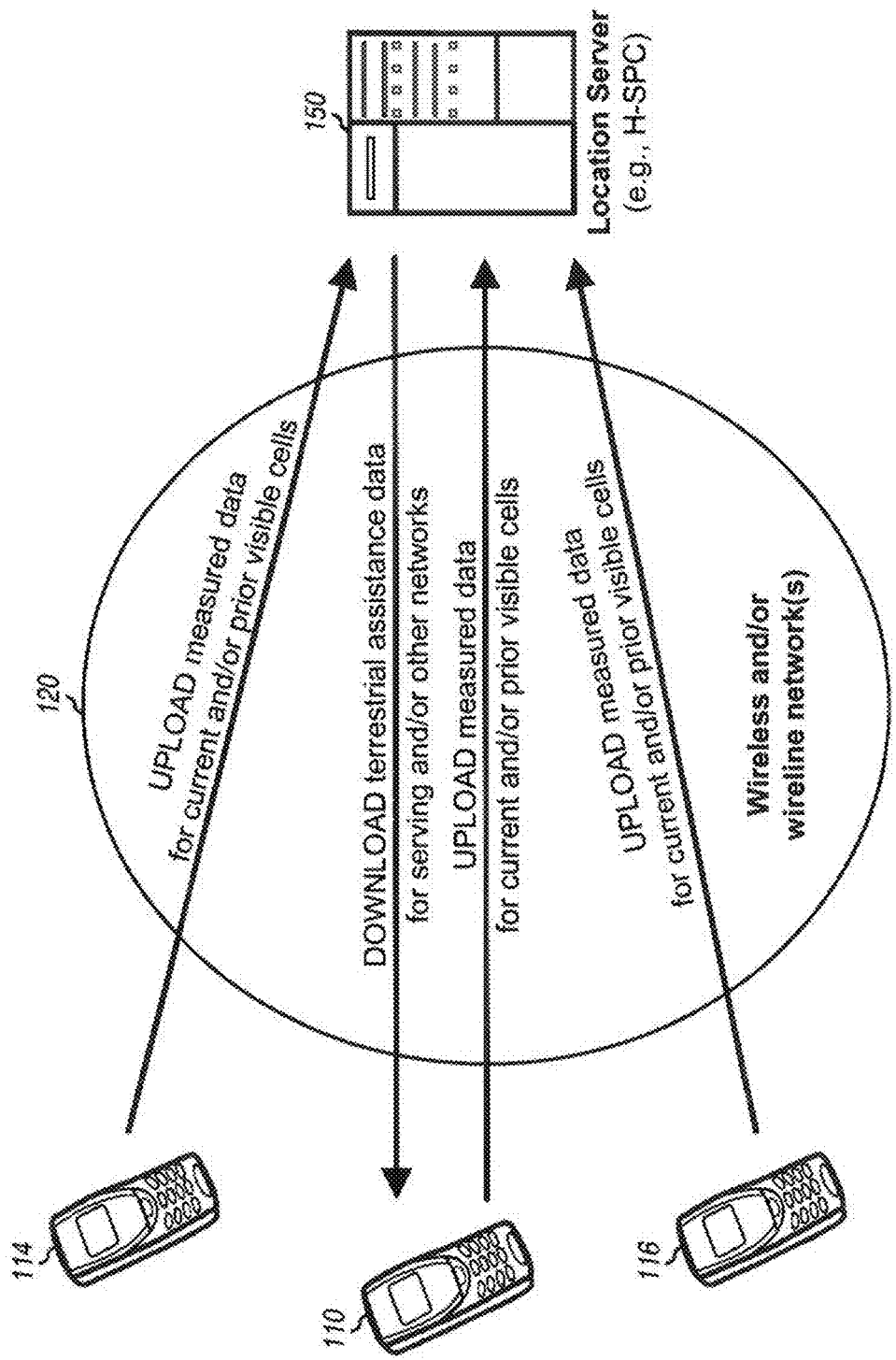
FIG. 14 shows download of assistance data and upload of measured data.

FIG. 14 shows use of XTRA to support delivery of assistance data. Terminal 110 may request for assistance data from location server 150. The request may be for terrestrial assistance data (e.g., RRLP, RRC, and IS-801 positioning assistance data) and/or navigation data (e.g., GPS ephemeris data).

One or more of the following types of download may be supported.

Location-based download—terminal 110 may download terrestrial assistance data for all base stations (e.g., in all wireless networks, all wireless networks whose technology and frequencies are supported by the terminal, or just the serving wireless network) within some distance D of its current location.

Usage-based download—terminal 110 may record base stations and/or WLAN APs and networks encountered (e.g., used or observed) by the terminal and may download terrestrial assistance data for more highly encountered base stations and WLAN APs and networks (and their neighbors). Location server 150 may record base station and WLAN AP usage and/or observation history for terminal 110 and may update on future XTRA interactions.

Usage and location-based download—terminal 110 may record locations visited by the terminal (e.g., one location estimate per hour) and may send its location history to location server 150. Terminal 110 may then download terrestrial assistance data for base stations near the most common locations (e.g., work, home, etc.) visited by the terminal. Location server 150 may record the location history for terminal 110 and update on future XTRA interactions.

For all download schemes described above, the downloaded terrestrial assistance data may include base station and WLAN AP locations, timing data (e.g., real time differences (RTDs), absolute time differences (ATDs), timing drift, etc.) to enable terminal-based positioning methods, fine time assistance (FTA) data, and/or other data. The terminal-based positioning methods may include E-OTD, OTDOA, A-FLT, E-CID, etc. Some terrestrial assistance data (e.g., timing data for asynchronous wireless technologies like Global System for Mobile communications (GSM), Wideband CDMA (WCDMA), and Long term Evolution (LTE)) may not be valid for an extended period of time. Location server 150 or terminal 110 may decide which data to download to terminal 110.

Terminal 110, 114 and 116 may upload measured data to location server 150. Terminal 110 may send the measured data via a SUPL Location ID parameter for each location fix, a SUPL Multiple Location IDs parameter for historic measurements, a SUPL location estimate for SET-assisted or SET-based positioning, proprietary data via interaction with location server 150, etc. The measured data may be for cells and networks in the current vicinity of terminal 110 or those that have been encountered in the past. The measured data may be used by location server 150 to build up a larger and more reliable database of terrestrial assistance data. Location server 150 may combine measured data from many terminals (e.g., terminals 110, 114, 116 in FIG. 14) for many different cells, base stations, WLAN APs and networks and may later provide portions of the combined data to terminals (e.g., terminal 110 in FIG. 14) to help them obtain their own locations.

The measured data may include various types of measurements such as WLAN AP measurements, RRLP E-OTD measurements, GSM Network Measurement Report (NMR) measurements, GSM FTA, RRC OTDOA measurements, WCDMA Measured Results List for WCDMA (MRL) measurements, WCDMA FTA, IS-801 A-FLT measurements and cell data, etc. The WLAN AP measurements may enable identities, locations, and IEEE 802.11v capabilities of WLAN APs to be determined. The RRLP E-OTD measurements, GSM NMR measurements, and GSM FTA may enable locations of GSM base stations to be determined or approximated, enable RTDs between GSM base stations to be determined, enable GPS time association for GSM base stations, etc. The RRC OTDOA measurements, WCDMA MRL measurements, and WCDMA FTA may enable locations of WCDMA base stations to be determined or approximated, enable RTDs between WCDMA base stations to be determined, enable GPS time association for WCDMA base stations, etc. The IS-801 A-FLT measurements and cell data may enable the locations, power output and timing of CDMA 1x, CDMA EvDO and UMB base stations to be determined or verified.

Location server 150 may receive the same or equivalent information from multiple terminals, e.g., information about the same cell or WLAN AP. Location server 150 may verify the information and may improve the reliability and accuracy of the information, e.g., by averaging corresponding information values. In addition, location server 150 may be able to combine information from different terminals to obtain new information, e.g., location coordinates of cell towers and WLAN APs from measurements of these different terminals.

Assistance data may be securely downloaded to terminal 110 and securely stored in terminal 110. The assistance data may be considered to be valuable and confidential to the location provider and may be protected from (i) eavesdropping and interception during download and (ii) unauthorized access at terminal 110 and location server 150. Security may be achieved by ciphering downloaded and uploaded data, ciphering or preventing external access to data stored in terminal 110, and protecting data stored in location server 150. Since data exchanged via SUPL is already ciphered, security may be focused in other areas where ciphering is not inherently used.

To provide security, assistance data stored on an externally readable memory within terminal 110 (including any memory that may be physically removed from terminal 110 and read externally) may be ciphered. Assistance data stored on processors within terminal 110 may be ciphered and/or protected from external access. To support XTRA, a unique processor or terminal identity, a secret key Ks, a public key Kp for location server 150, and/or other parameters may be preconfigured on terminal 110. Additional secret keys K1, K2, etc., may be negotiated between terminal 110 and location server 150 during interaction with the location server for XTRA. Secret keys K1, K2, etc., may be used to cipher data for upload, download, and storage.

Not all data may be ciphered on terminal 110, e.g., at least one secret key may be stored in non-ciphered form in order to decipher other data. Some memory in terminal 110 may be secure (e.g., memory resident in a processor chip in terminal 110) and it may not be possible to read or in any way obtain the contents of this memory without permanently damaging or destroying the memory. In this case, certain critical data may be stored in this memory including cipher keys, the address of location center 130, the address of location server 150, location services enabled or supported by these servers, and the identity or identities (public or private) of the terminal. The amount of critical data may be fairly small (e.g., a few hundred bytes), which may be helpful if the amount of secure memory available to terminal 110 is limited (e.g., for cost reasons). Other less critical data may be stored in memory that can be read externally. Such data may include BSA data and GPS and other satellite ephemeris data provided by location server 150, and measurements of base stations and WLAN APs made by terminal 110. Such less critical data may be more extensive, e.g., one or more Megabytes. This less critical data may still be protected by ciphering it using security keys stored non-ciphered within the secure memory of terminal 110. Similar security mechanisms may also be employed within location center 130 and location server 150 in order to protect both critical and less critical data.

Terminal 110 may interact with location server 150 in a secure manner for XTRA. Terminal 110 and location server 150 may authenticate one another prior to data download or upload. The integrity of data may be protected during download and upload based on various security schemes.

In a first security scheme, terminal 110 has a unique identity and a unique secret key Ks. Terminal 110 and location server 150 may perform secure PSK-TLS mutual authentication using the secret key Ks. Ciphering may then be invoked and additional mutual secret keys K1, K2, etc., may be assigned if preferred. Future uploads and downloads may be protected using the secret key Ks and/or K1, K2, etc.

In a second security scheme, terminal 110 has an identity and a secret key Ks that are common to other terminals but kept confidential. Sharing common keys for many or all terminals as opposed to assigning unique keys to each terminal may be used to reduce manufacturing and operating costs. Terminal 110 and location server 150 may perform PSK-TLS mutual authentication using the secret key Ks. A unique identity and one or more unique secret keys K1, K2, etc., may then be negotiated and stored in terminal 110 and location server 150. Future uploads and downloads may be protected using unique secret keys K1, K2, etc.

In a third security scheme, terminal 110 has the public key Kp of location server 150. Terminal 110 may authenticate location server 150 using, e.g., TLS with Rivest Shamir Adleman (RSA) asymmetric key method. Location server 150 may implicitly authenticate terminal 110 by virtue of correct interaction by terminal 110 with server 150 (e.g., if this interaction is not publicly defined). A unique identity and one or more unique secret keys K1, K2, etc., may be negotiated and stored in terminal 110 and location server 150 for future downloads and uploads. Alternatively, terminal 110 may continue to use the public key Kp for future downloads and uploads.

In a fourth security scheme, terminal 110 has the public key Kp of location server 150 and a public key security certificate that includes a digital signature of public and other information for terminal 110 such as its public identity information. The digital signature may be obtained using a secret key associated with public key Kp or some other public key known to location server 150. Terminal 110 may authenticate location server 150 using, e.g., TLS with RSA asymmetric key method. Location server 150 may similarly authenticate terminal 110 using its public key security certificate and associated known public key, e.g., using TLS with RSA. A unique identity and one or more unique secret keys K1, K2, etc., may then be negotiated and stored in terminal 110 and location server 150 for future downloads and uploads. Alternatively, terminal 110 may continue to use the public key Kp and the public key security certificate for future downloads and uploads.

To simplify security, a common identity, a common secret key Ks, and/or a common public key Kp may be used for multiple terminals but may be kept confidential. Terminal 110 and location server 150 may then negotiate a unique identity and a unique secret key K1 for the terminal. A unique secret key for the terminal may also be obtained in other manners. In any case, the unique identity may be useful to maintain records about terminal 110 in or accessible by location server 150, to identify and filter out faulty or unreliable terminals, to find a lost or stolen terminal, to identify repeated duplicate BSA data uploads and downloads, to maintain records for each individual terminal (e.g., the most common locations and/or base stations used by each terminal), etc. Terminal 110 may fall back to the original secret key Ks or public key Kp if secret key K1 is lost or corrupted on terminal 110 or location server 150. Authentication interaction procedure between terminal 110 and location server 150 may be the same or similar for both initial and subsequent access. The authentication interaction procedure may also be the same or similar to that used for location requests (e.g., SUPL SSK authentication).

Measurements may be sent by terminals via SUPL or some other location solution to location server 150 and may be used to build up terrestrial assistance data. Assistance data (e.g., terrestrial assistance data and/or navigation data) may also be downloaded by terminals via SUPL or some other location solution from location server 150.

For download, SUPL 1.0 supports download of BSA data only for nearby cells. The BSA data may include latitude and longitude of base transceiver system (BTS) and RTDs and may be intended for SET-based positioning methods such as E-OTD and OTDOA. SUPL 2.0 or a later version of SUPL may support download of navigation data using extended ephemeris and extended almanac corrections at the RRLP, RRC and IS-801 levels. A later version of SUPL may support download of BSA data for geographic areas extending beyond the immediate coverage of a terminal.

For upload, SUPL 1.0 supports limited upload of cell ID and cell measurements results for the current serving CDMA, WCDMA or GSM cell. SUPL 2.0 supports upload of data for the serving cell and other received cells, WLAN information, and historic cell measurement data (e.g., over last 10 minutes). Location server 150 may request historic measurements stored in terminal 110 over a long period (e.g., hours or days). Location server 150 may inform terminal 110 which cell types and BSA measurements to report. Terminal 110 may report various types of information for the current serving cell and previous serving cells (e.g., over the last 10 minutes). Terminal 110 may also report individually on each cell and WLAN AP that can be received. Location server 150 may obtain historic measurements from terminal 110 over any period of time if previously stored in terminal 110.

Terminal 110 may upload various types of information. Terminal 110 may provide GSM cell information such as cell ID and timing advance (TA) for the serving GSM cell, received signal level for (e.g., up to 15) other cells obtained at the same time, etc. Terminal 110 may provide WCDMA cell information such as (i) cell ID and UTRA carrier received signal strength indicator (RSSI) level for the serving WCDMA cell and (ii) cell ID, CPICH Ec/No, CPICH RSCP, and/or path loss for (e.g., up to 32) neighbor cells, etc. Terminal 110 may provide CDMA cell information such as cell ID (NID, SID), base station latitude/longitude, and GPS time (with second granularity). Terminal 110 may provide WLAN AP information such as a Medium Access Control (MAC) address, AP transmit power, antenna gain, received signal-to-noise ratio (S/N) and signal strength, 802.11 type, RTD, reported location of WLAN AP, SET transmit power, antenna gain, and S/N and signal strength received at WLAN AP. Terminal 110 may also provide A-GPS FTA for GSM, WCDMA and CDMA.

Figure 15:
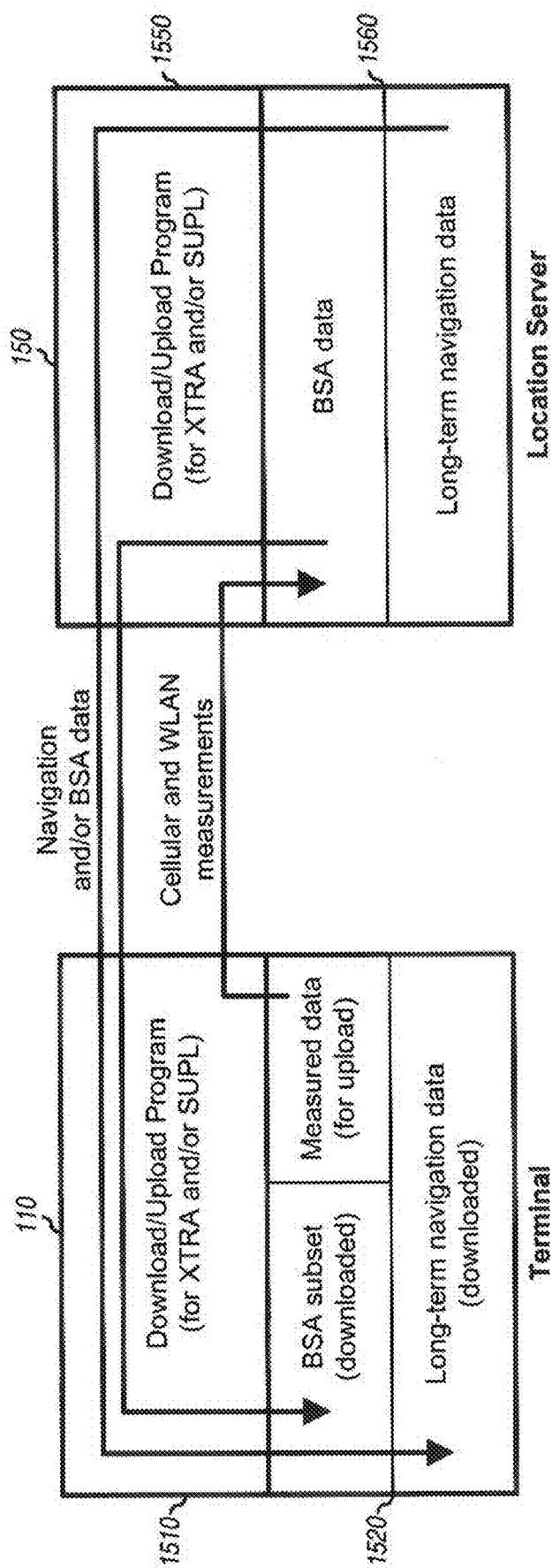
FIG. 15 shows a design for supporting data download and upload.

FIG. 15 shows a design of terminal 110 and location server 150. Terminal 110 may include a download/upload program 1510 and a memory 1520. Program 1510 may support data download and upload via SUPL, XTRA, and/or some other location solution or protocol. Memory 1520 may store (i) measured data comprising cellular and/or WLAN measurements made by terminal 110 and suitable for upload, (ii) a BSA subset comprising terrestrial assistance data downloaded from location server 150, and/or (iii) navigation data downloaded from location server 150 by the terminals.

Location server 150 may include a download/upload program 1550 and a memory 1560. Program 1550 may support data download and upload via SUPL, XTRA, and/or some other location solution or protocol. Memory 1560 may store a BSA database comprising terrestrial assistance data and/or a database of navigation data, which may be downloaded from location server 150.

For SUPL, data download and upload may be supported with various existing SUPL messages. Location server 150 may send a SUPL INIT message, a SUPL RESPONSE message, or a SUPL TRIGGERED RESPONSE message with measurements supported by location server 150. Terminal 110 may send a SUPL START message, a SUPL POS INIT message, or a SUPL REPORT message with cell and/or WLAN measurements supported by location server 150. Location server 150 may also send a SUPL POS message carrying an RRLP/RRC/IS-801 message with navigation data. For XTRA, download and upload of terrestrial assistance data may be supported with XTRA and/or SUPL messages.

The data uploaded from terminals via SUPL and/or other location solutions may be used to build up a database for base stations and WLAN APs. The uploaded data may also be used by location server 150 to derive location estimates for terminals and for downloading to terminals for self-fixes.

Figure 16:
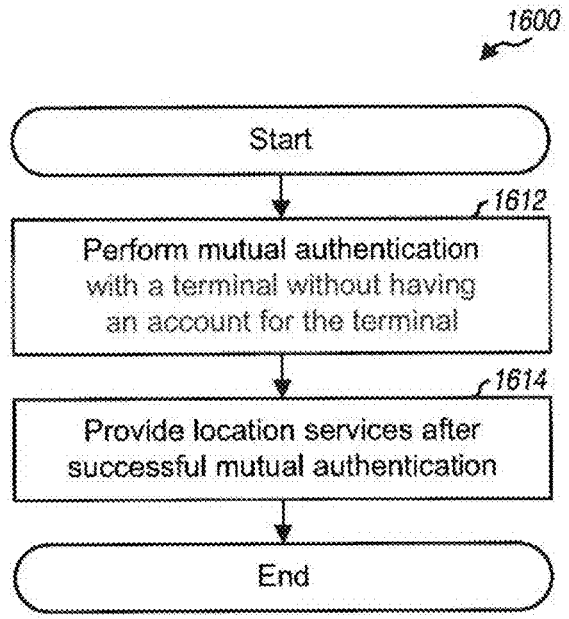
FIGS. 16, 17, and 18 show three processes to support delivery of assistance data.

FIG. 16 shows a design of a process 1600 for supporting location services. Process 1600 may be performed by location server 150 or some other entity. The location server may perform mutual authentication with a terminal without having an account for the terminal (block 1612). The location server may provide location services after successful mutual authentication (block 1614).

The mutual authentication may be performed in various manners. In a first scheme, the location server may perform mutual authentication with the terminal based on a unique secret key for the terminal, generate at least one mutual secret key after successful mutual authentication, and use the at least one mutual secret key for secure communication with the terminal. In a second scheme, the location server may perform mutual authentication with the terminal based on a secret key applicable for a plurality of terminals including the terminal, generate at least one mutual secret key after successful mutual authentication, and use the at least one mutual secret key for secure communication with the terminal. In a third scheme, the location server may perform mutual authentication with the terminal based on a public key for a location server, generate at least one secret key after successful mutual authentication, and use the at least one mutual secret key for secure communication with the terminal. The mutual authentication may also be performed in other manners.

For block 1614, the location server may receive a request for assistance data from the terminal and may download requested assistance data to the terminal. The location server may also receive measured data from the terminal and may update a database of assistance data based on the measured data. The location server may also determine and/or provide the terminal's location to the terminal and/or LCS clients.

Figure 17:
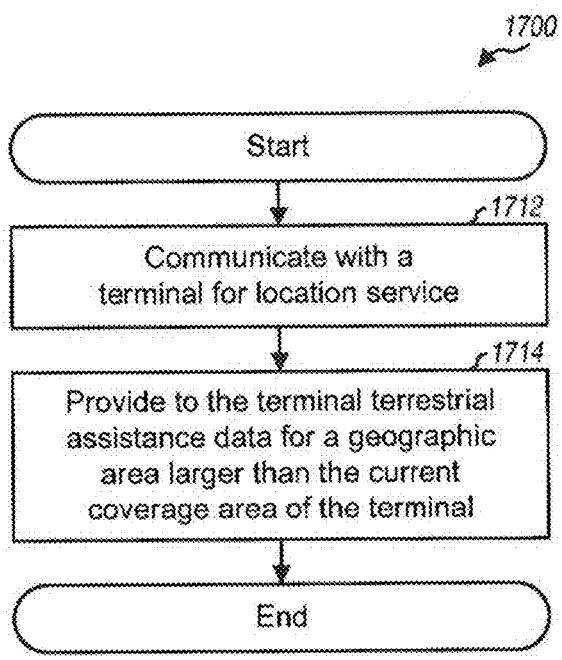

FIG. 17 shows a design of a process 1700 for supporting delivery of terrestrial assistance data. Process 1700 may be performed by location server 150 or some other entity. The location server may communicate with a terminal for location service (block 1712). The location server may provide to the terminal terrestrial assistance data for a geographic area larger than the current coverage area of the terminal (block 1714). The geographic area may be determined based on areas where the terminal is likely to be located. For location-based download, the location server may provide terrestrial assistance data for base stations within a predetermined distance of the current location of the terminal. For usage-based download, the location center may receive information indicative of base stations encountered (e.g., used and/or observed previously) by the terminal, determine the geographic area based on areas encompassing the encountered base stations, and provide terrestrial assistance data for base stations within the geographic area. For usage and location-based download, the location server may receive information indicative of locations visited by the terminal, determine the geographic area based on areas encompassing the visited locations, and provide terrestrial assistance data for base stations within the geographic area. The terrestrial assistance data may also be for WLAN APs and networks and/or other terrestrial stations.

Figure 18:
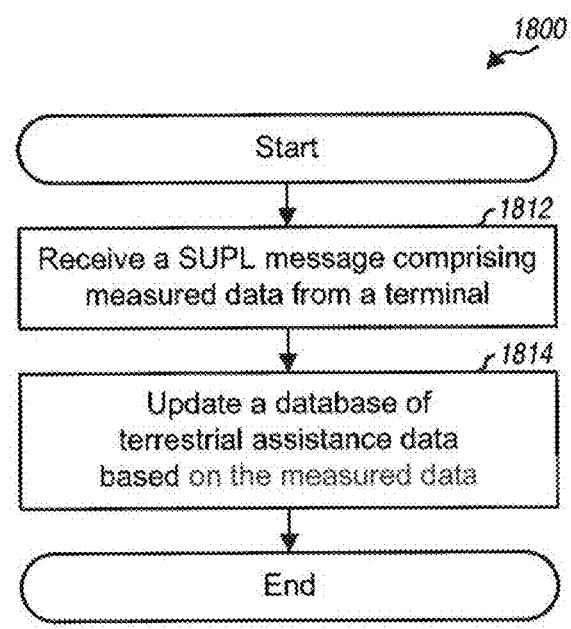

FIG. 18 shows a design of a process 1800 for supporting uploading of measured data. Process 1800 may be performed by location server 150 or some other entity. The location server may receive a SUPL message comprising measured data from a terminal (block 1812). The location server may update a database of terrestrial assistance data based on the measured data (block 1814). The measured data may comprise one or more of the following: a cell ID of a serving cell, timing advance for the serving cell, received signal level of the serving cell, received signal level of at least one neighbor cell, base station latitude and longitude, timing difference between two cells, timing drift between two cells, timing difference between a cell and an absolute time source, timing drift between a cell and an absolute time source, satellite (e.g., GPS) measurements, a location estimate, a MAC address for a WLAN access point, transmit power of the access point, antenna gain of the access point, received S/N of the access point, signal strength of the access point, IEEE 802.11 type of the access point, RTD for the access point, reported location of the access point, transmit power of the terminal, antenna gain of the terminal, and S/N for the terminal at the access point.

FIGS. 16 to 18 show processes performed by location server 150. Terminal 110 may perform processes complementary to the processes in FIGS. 16 to 18.

Figure 19:
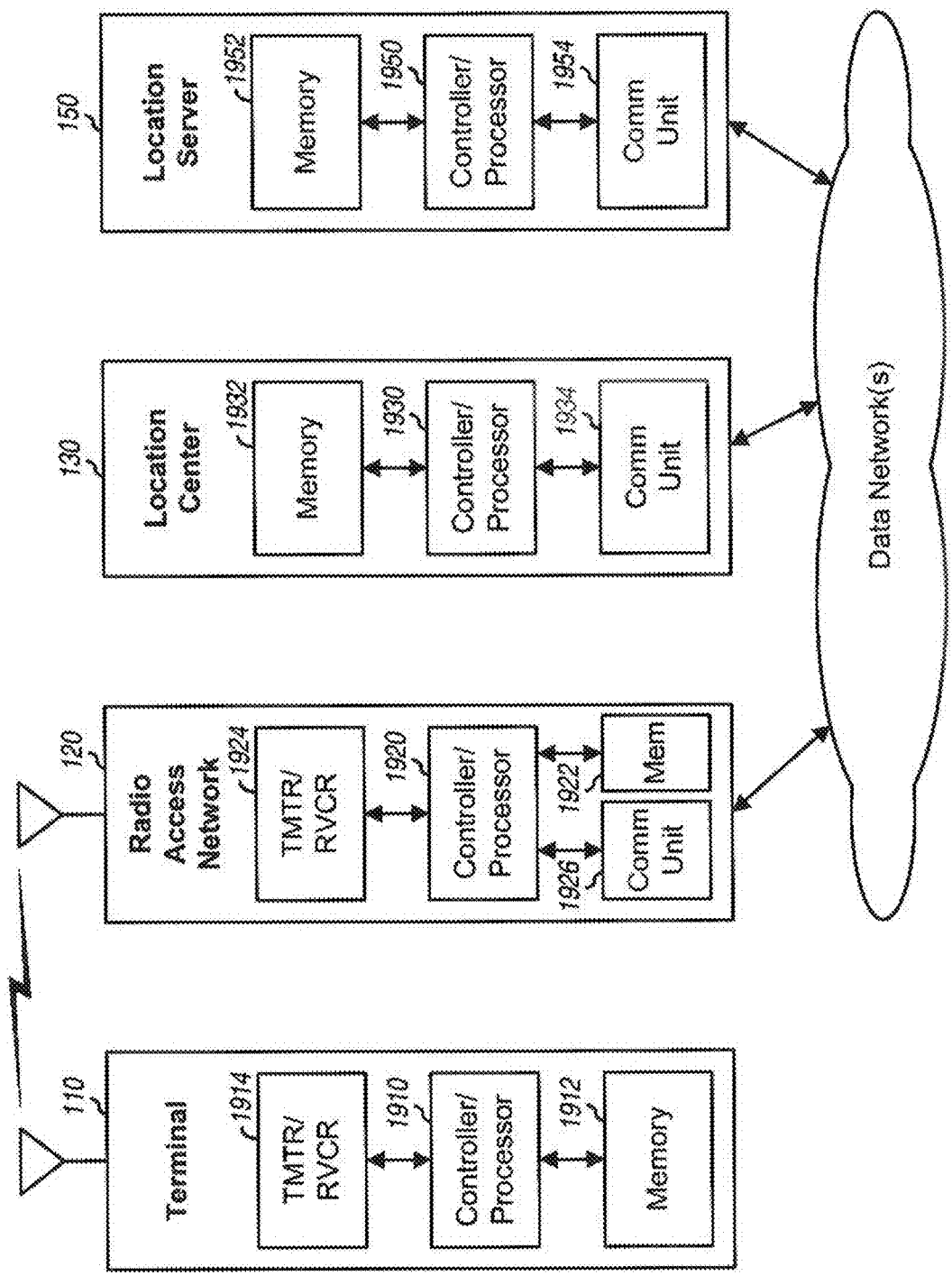
FIG. 19 shows a block diagram of the terminal, a radio access network (RAN), the location center, and a location server.

FIG. 19 shows a block diagram of a design of terminal 110, a radio access network (RAN) 120, location center 130, and location server 150. For simplicity, FIG. 19 shows (i) one controller/processor 1910, one memory 1912, and one transmitter/receiver (TMTR/RCVR) 1914 for terminal 110, (ii) one controller/processor 1920, one memory 1922, one transmitter/receiver 1924, and one communication (Comm) unit 1926 for RAN 120, (iii) one controller/processor 1930, one memory 1932, and one communication unit 1934 for location center 130, and (iv) one controller/processor 1950, one memory 1952, and one communication unit 1954 for location server 150. In general, each entity may include any number of controllers, processors, memories, transceivers, communication units, etc.

On the downlink, base stations in RAN 120 transmit traffic data, messages/signaling, and pilot to terminals within their coverage areas. These various types of data are processed by processor 1920, conditioned by transmitter 1924, and transmitted on the downlink. At terminal 110, the downlink signals from base stations are received via an antenna, conditioned by receiver 1914, and processed by processor 1910 to obtain various types of information for positioning and location and other services. Processor 1910 may perform or direct process 1300 in FIG. 13 and/or other processes for the techniques described herein. Memories 1912 and 1922 store program codes and data for terminal 110 and RAN 120, respectively. On the uplink, terminal 110 may transmit traffic data, messages/signaling, and pilot to base stations in RAN 120. These various types of data are processed by processor 1910, conditioned by transmitter 1914, and transmitted on the uplink. At RAN 120, the uplink signals from terminal 110 and other terminals are received and conditioned by receiver 1924 and further processed by processor 1920 to obtain various types of information, e.g., data, messages/signaling, etc. RAN 120 may communicate with other network entities via communication unit 1926.

Within location center 130, processor 1930 performs location and/or positioning processing for the location center. Processor 1930 may perform or direct process 1200 in FIG. 12, process 1600 in FIG. 16, process 1700 in FIG. 17, process 1800 in FIG. 18, and/or other processes for the techniques described herein. Memory 1932 stores program codes and data for the location center. Communication unit 1934 allows location center 130 to communicate with other entities.

Within location server 150, processor 1950 performs location and/or positioning processing for terminals, download of assistance data to terminals, and upload of measured data from terminals, etc. Processor 1950 may perform or direct process 1600 in FIG. 16, process 1700 in FIG. 17, process 1800 in FIG. 18, and/or other processes for the techniques described herein. Memory 1952 stores program codes and data for the location server. Communication unit 1954 allows the location server to communicate with other entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, computer firmware, or combinations of these. To clearly illustrate this interchangeability of hardware, software and firmware, various illustrative components, blocks, modules, circuits, and steps have been described above generally in terms of their functionality. Whether such functionality is implemented as hardware, software or firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, as part of firmware, or in a combination of these. A software module may reside in RAM memory, flash memory, ROM memory, EPROM memory, EEPROM memory, registers, hard disk, a removable disk, a CD-ROM, or any other form of storage medium known in the art. A firmware module may reside in ROM memory, PROM memory, EPROM memory, EEPROM memory or may be part of a processing device.

An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

The invention claimed is:

1. A method of supporting location services for a terminal by a location server, the method comprising:
    receiving one or more authentication parameters from the terminal;
    receiving measured data from the terminal at a communications unit of the location server, the measured data comprising information related to a serving base station of the terminal;
    in response to determining the terminal is authorized to access the location server based on the one or more authentication parameters, determining, by the location server, a geographic area that is larger than a current coverage area of the serving base station of the terminal based on the measured data; and
    providing, to the terminal, terrestrial assistance data for base stations within the determined geographic area.

2. The method of claim 1, wherein the determining the geographic area comprises determining the geographic area based on areas where the terminal is likely to be located.

3. The method of claim 1, wherein the providing terrestrial assistance data to the terminal comprises providing terrestrial assistance data for base stations within a predetermined distance from a current location of the terminal.

4. The method of claim 1, wherein the receiving the measured data comprises receiving information indicative of base stations encountered by the terminal, and further wherein the determining the geographic area comprises determining the geographic area based on areas encompassing the encountered base stations.

5. The method of claim 1, wherein the receiving the measured data comprises receiving information indicative of locations visited by the terminal, and further wherein the determining the geographic area comprises determining the geographic area based on areas encompassing the visited locations.

6. The method of claim 1, wherein the providing terrestrial assistance data to the terminal comprises sending at least one Secure User Plane Location (SUPL) message comprising the terrestrial assistance data to the terminal.

7. A location server for supporting location services for a terminal, the location server comprising:
    a communications unit configured to:
        receive one or more authentication parameters from the terminal;
        receive measured data from the terminal, the measured data comprising information related to a serving base station of the terminal;
    at least one processor, coupled to the communications unit, configured to in response to determining the terminal is authorized to access the location server based on the one or more authentication parameters, determine a geographic area larger than a current coverage area of the serving base station of the terminal based on the measured data and configured to provide, to the terminal, terrestrial assistance data for base stations within the determined geographic area; and
    a memory coupled to the at least one processor.

8. The location server of claim 7, wherein the at least one processor is configured to provide terrestrial assistance data for base stations within a predetermined distance from a current location of the terminal.

9. The location server of claim 7, wherein the measured data comprising information indicative of base stations encountered by the terminal, and further wherein the at least one processor is configured to determine the geographic area based on areas encompassing the encountered base stations.

10. The location server of claim 7, wherein the measured data comprising information indicative of locations visited by the terminal, and further wherein the at least one processor is configured to determine the geographic area based on areas encompassing the visited locations.

* * * * *